US009789607B1

(12) United States Patent
Whitman

(10) Patent No.: US 9,789,607 B1
(45) Date of Patent: Oct. 17, 2017

(54) ACHIEVING A TARGET GAIT IN A LEGGED ROBOT BASED ON STEERING COMMANDS

(71) Applicant: Google Inc., Mountain View, CA (US)

(72) Inventor: Eric Whitman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 98 days.

(21) Appl. No.: 14/931,458

(22) Filed: Nov. 3, 2015

(51) Int. Cl.
| G05B 19/18 | (2006.01) |
| B25J 9/16 | (2006.01) |
| B25J 5/00 | (2006.01) |
| B25J 13/00 | (2006.01) |

(52) U.S. Cl.
CPC .............. B25J 9/1664 (2013.01); B25J 5/00 (2013.01); B25J 9/1628 (2013.01); B25J 9/1666 (2013.01); B25J 13/006 (2013.01); *Y10S 901/01* (2013.01)

(58) Field of Classification Search
USPC ....................................................... 700/252
See application file for complete search history.

(56) References Cited

U.S. PATENT DOCUMENTS

| 5,086,870 A | 2/1992 | Bolduc |
| 7,106,300 B2 | 9/2006 | Saylor et al. |
| 7,496,428 B2 | 2/2009 | Takenaka et al. |
| 8,457,830 B2 | 6/2013 | Goulding |
| 8,630,763 B2 | 1/2014 | Goulding |
| 8,974,543 B2 | 3/2015 | Balboni et al. |
| 9,044,859 B2 | 6/2015 | Cory |
| 9,586,316 B1 * | 3/2017 | Swilling ................ B25J 9/1664 |
| 2011/0231050 A1 * | 9/2011 | Goulding ............. B62D 57/024 701/26 |
| 2011/0264264 A1 | 10/2011 | Shirokura et al. |
| 2013/0310979 A1 * | 11/2013 | Herr ...................... B62D 57/032 700/258 |
| 2014/0261887 A1 | 9/2014 | Groot et al. |
| 2015/0202768 A1 * | 7/2015 | Moridaira ............ B62D 57/032 700/258 |

OTHER PUBLICATIONS

Burridge et al., "Sequential Composition of Dynamically Dexterous Robot Behaviors," The International Journal of Robotics Research, 1999, pp. 534-555, vol. 18, No. 6.

(Continued)

*Primary Examiner* — Harry Oh
(74) *Attorney, Agent, or Firm* — Honigman Miller Schwartz and Cohn LLP

(57) ABSTRACT

Based on input steering commands, a legged robot may select a target gait. Based on the target gait, the legged robot may obtain a list of gait controllers. Each gait controller may define a gait of the legged robot, and include validity tests and steering commands. The legged robot may apply a cost function to the gait controllers, where the cost for a gait controller is based on a difference between the steering commands of the gait controller and the input steering commands, and a proximity of the legged robot to obstacles should the legged robot operate according the gait controller. The legged robot may reorder the list in increasing magnitude of the cost function, and traverse the list until a validity test associated with a particular gait controller passes. The legged robot may actuate its legs according to the steering commands of the particular gait controller.

20 Claims, 25 Drawing Sheets

(56) References Cited

OTHER PUBLICATIONS

Gong et al., "A Review of Gait Optimization Based on Evolutionary Computation," Applied Computational Intelligence and Soft Computing, 2010, 12 pages.

Haynes et al., "Gaits and Gait Transitions for Legged Robots," Proceedings of the 2006 IEEE International Conference on Robotics and Automation, Orlando, Florida, May 2006, pp. 1117-.

Johnson et al., "Disturbance Detection, Identification, and Recovery by Gait Transition in Legged Robots," The 2010 IEEE/RSJ International Conference on Intelligent Robots and Systems, Oct. 18-22, 2010, Taipei, Taiwan, pp. 5347-5353.

Kantor et al., "Sequential Composition for Control of Underactuated Systems," Robotics Institute, Carnegie Mellon University, Pittsburgh, Pennsylvania, Nov. 2003, pp. 1-16.

Santos et al., "Gait transition and modulation in a quadruped robot: A brainstem-like modulation approach," Robotics and Autonomous Systems, 2011, pp. 620-634, vol. 59.

Wikipedia, "Horse gait," https://en.wikipedia.org/wiki/Horse_gait, Jul. 17, 2015, 9 pages.

* cited by examiner

| List Pos. | Gait Controller | Yaw error | Velocity error | Obstacle proximity error | Total error |
|---|---|---|---|---|---|
| 1. | Slow walk (forward, 10 deg/s yaw rate) | 0 | 5 | 100 | 105 |
| 2. | Slow walk (forward, 0 deg/s yaw rate) | 10 | 5 | 0 | 15 |
| 3. | Slow walk (forward, -10 deg/s yaw rate) | 20 | 5 | 200 | 225 |
| 4. | Stand to slow walk (forward, 10 deg/s yaw rate) | 0 | 5 | 100 | 105 |
| 5. | Stand to slow walk (forward, 0 deg/s yaw rate) | 10 | 5 | 0 | 15 |
| 6. | Stand to slow walk (forward, -10 deg/s yaw rate) | 20 | 5 | 200 | 225 |
| 7. | Fast walk (forward) to slow walk (forward, 10 deg/s yaw rate) | 0 | 5 | 100 | 105 |
| 8. | Fast walk (forward) to slow walk (forward, 0 deg/s yaw rate) | 10 | 5 | 0 | 15 |
| 9. | Fast walk (forward) to slow walk (forward, -10 deg/s yaw rate) | 20 | 5 | 200 | 225 |
| 10. | Fast walk (forward, 10 deg/s yaw rate) | 0 | 15 | 100 | 115 |
| 11. | Fast walk (forward, at 0 deg/s yaw rate) | 10 | 15 | 0 | 25 |
| 12. | Fast walk (forward, -10 deg/s yaw rate) | 20 | 15 | 200 | 235 |

Figure 16

| List Pos. | Gait Controller | Validity Check | Output Parameters | Total error |
|---|---|---|---|---|
| 1. | Slow walk (forward, 0 deg/s yaw rate) | Walking and 0.5 MPH < velocity < 2.5 MPH? | Walk (forward, 1.5 MPH, 0 deg/s yaw rate) | 15 |
| 2. | Stand to slow walk (forward, 0 deg/s yaw rate) | Standing and velocity < 0.5 MPH | Transition from standing to walk (forward, 1.5 MPH, 0 deg/s yaw rate) | 15 |
| 3. | Fast walk to slow walk (forward, 0 deg/s yaw rate) | Walking and 2.5 MPH < velocity < 4.5 MPH? | Transition from standing to walk (forward, 1.5 MPH, 0 deg/s yaw rate) | 15 |
| 4. | Fast walk (forward, at 0 deg/s yaw rate) | Walking and 2.5 MPH < velocity < 4.5 MPH? | Walk (forward, 3.5 MPH, 0 deg/s yaw rate) | 25 |
| 5. | Slow walk (forward, 10 deg/s yaw rate) | Walking and 0.5 MPH < velocity < 2.5 MPH? | Walk (forward, 1.5 MPH, 10 deg/s yaw rate) | 105 |
| 6. | Stand to slow walk (forward, 10 deg/s yaw rate) | Standing and velocity < 0.5 MPH | Transition from standing to walk (forward, 1.5 MPH, 10 deg/s yaw rate) | 105 |
| 7. | Fast walk to slow walk (forward, 10 deg/s yaw rate) | Walking and 2.5 MPH < velocity < 4.5 MPH? | Transition from standing to walk (forward, 1.5 MPH, 10 deg/s yaw rate) | 105 |
| 8. | Fast walk (forward, 10 deg/s yaw rate) | Walking and 2.5 MPH < velocity < 4.5 MPH? | Walk (forward, 3.5 MPH, 10 deg/s yaw rate) | 115 |
| 9. | Slow walk (forward, -10 deg/s yaw rate) | Walking and 0.5 MPH < velocity < 2.5 MPH? | Walk (forward, 1.5 MPH, -10 deg/s yaw rate) | 225 |
| 10. | Stand to slow walk (forward, -10 deg/s yaw rate) | Standing and velocity < 0.5 MPH | Transition from standing to walk (forward, 1.5 MPH, -10 deg/s yaw rate) | 225 |
| 11. | Fast walk to slow walk (forward, -10 deg/s yaw rate) | Walking and 2.5 MPH < velocity < 4.5 MPH? | Transition from standing to walk (forward, 1.5 MPH, -10 deg/s yaw rate) | 225 |
| 12. | Fast walk (forward, -10 deg/s yaw rate) | Walking and 2.5 MPH < velocity < 4.5 MPH? | Walk (forward, 3.5 MPH, -10 deg/s yaw rate) | 235 |

Figure 17

ACHIEVING A TARGET GAIT IN A LEGGED ROBOT BASED ON STEERING COMMANDS

BACKGROUND

A gait of a legged robot is typically viewed as a cyclic pattern of leg movements that produces locomotion through a sequence of foot contacts with a surface. The legs provide support for the body of the legged robot while the forces resulting from surface contact propel the legged robot. A particular gait (e.g., walk, trot, run) may include several variations based on difference cadences and input steering directions. Selection of a gait variation when the legged robot is in a particular state can be challenging, as some variations might result in the robot becoming unstable or exhibiting undesirable movement.

SUMMARY

The implementations herein involve selection of a gait for a legged robot. In some cases, the gait may be selected based on a state of the legged robot and/or one or more input steering commands obtained by the legged robot. Each gait may be represented as a gait controller that includes a mapping from the state of the legged robot and/or steering command(s) to output parameters that achieve the gait in accordance with the steering commands. Each gait controller may include a validity check that tests whether the instantaneous state of the legged robot allows the associated gait to be achieved. The integration of steering commands into the gait controllers allows fine-grained control over the legged robot's movement.

In particular, the gait controllers may be arranged in an ordered list such that a target gait controller for a target gait is at the beginning of the ordered list, and other gait controllers are placed in the ordered list based on how the legged robot can transition from their respective gaits to the target gait. In some implementations, gait controllers representing gaits and steering commands that are more similar to the target gait and input steering commands are placed closer to the beginning of the ordered list than those representing gaits that are less similar to the target gait and input steering commands.

The ordered list may be traversed in order from its beginning, and the gait controllers therein may be examined. For each gait controller examined, the associated validity check may be tested. A validity check associated with a particular gait controller may determine whether the gait controller is permitted to operate based on the state of the robot, the input steering commands, and/or a sensed environment of the robot. When a validity check of a particular gait controller passes, the legged robot may be operated for a period of time according to the associated gait and steering commands. The ordered list may be traversed again from the beginning, resulting in the selection of the same or a different gait controller. The process may repeat dozens or hundreds of times per second to provide fine-grained control over the legged robot's locomotion.

Accordingly, a first example implementation may involve, possibly based on input steering commands for a legged robot, selecting a target gait for the legged robot. The legged robot may include leg members and leg joints. The first implementation may also involve, possibly based on the target gait, obtaining an ordered list of gait controllers. The gait controllers in the ordered list (i) may define respective gaits of the legged robot, and (ii) may include respective validity tests and output parameters for the respective gaits. The output parameters may include respective steering commands. The first implementation may further involve applying a cost function to the gait controllers in the ordered list. The cost function may assign respective costs to each gait controller. A cost for a given gait controller may be based on (i) a difference between the steering commands of the given gait controller and the input steering commands, and (ii) a proximity of the legged robot to one or more obstacles should the legged robot operate according a given gait of the given gait controller for a pre-defined period of time. The first example implementation may additionally involve reordering the ordered list in increasing magnitude of the cost function, and traversing the ordered list in order until a validity test associated with a particular gait controller passes. The first example implementation may also involve instructing the robot to actuate the leg members and/or leg joints according to output parameters of the particular gait controller.

In a second example implementation, an article of manufacture may include a non-transitory computer-readable medium, having stored thereon program instructions that, upon execution by a computing device, cause the computing device to perform operations in accordance with the first example implementation.

In a third example implementation, a legged robot may include leg members, leg joints, at least one processor, and data storage. Program instructions may be stored in the data storage, and upon execution by the at least one processor, the program instructions may cause the legged robot to perform operations in accordance with the first example implementation.

In a fourth example implementation, a system may include various means for carrying out each of the operations of the first example implementation.

Moreover, the input steering commands may include planar (x,y) velocity components and a yaw rate. These commands be used to instruct a robotic device (legged or wheeled) to move in accordance with the specified velocities and yaw rate. However, in some cases, it may be desirable for the robotic device to not adhere strictly to the commanded input. For instance, the robotic device might detect an obstacle in its path, and may choose to deviate from the commanded velocities and/or yaw rate so that it can avoid contact with the obstacle. In particular, the robotic device may determine that if it follows the commanded trajectory, it will collide with or come too close to the obstacle within a particular period of time (e.g., within the next 1-5 seconds). Thus, it is beneficial if the robotic device can derive, from the input steering commands, a modified version thereof that can be used to adjust the robotic device's behavior.

Accordingly, a fifth example implementation may involve receiving, by a robotic device, input steering commands specifying an x direction velocity parameter, a y direction velocity parameter, and a yaw rate parameter. The fifth example implementation may also involve receiving, by the robotic device, sensor information regarding surroundings of the robotic device. The fifth example implementation may further involve, possibly based on a comparison of state of the robot, the sensor information, and the input steering commands, determining a scaling factor and a constant for a particular parameter of the input steering commands. The fifth example implementation may additionally involve modifying the particular parameter by the scaling factor and the constant, and instructing the robotic device to move according to the input steering commands as modified.

In a sixth example implementation, an article of manufacture may include a non-transitory computer-readable medium, having stored thereon program instructions that, upon execution by a computing device, cause the computing device to perform operations in accordance with the fifth example implementation.

In a seventh example implementation, a legged robot may include leg members, leg joints, at least one processor, and data storage. Program instructions may be stored in the data storage, and upon execution by the at least one processor, the program instructions may cause the legged robot to perform operations in accordance with the fifth example implementation.

In an eighth example implementation, a system may include various means for carrying out each of the operations of the fifth example implementation.

These as well as other implementations, aspects, features, advantages, and alternatives will become apparent to those of ordinary skill in the art by reading the following detailed description, with reference where appropriate to the accompanying drawings. Further, it should be understood that this summary and other descriptions and figures provided herein are intended to illustrate implementations by way of example only and, as such, that numerous variations are possible. For instance, structural elements and process steps can be rearranged, combined, distributed, eliminated, or otherwise changed, while remaining within the scope of the implementations as claimed.

BRIEF DESCRIPTION OF THE DRAWINGS

FIG. 16 depicts a list of gait controllers with associated costs, according to example implementations.

FIG. 17 depicts a reordered list of gait controllers, according to example implementations.

DETAILED DESCRIPTION

Example methods, devices, and systems are described herein. It should be understood that the words "example" and "exemplary" are used herein to mean "serving as an example, instance, or illustration." Any implementation, aspect, or feature described herein as being an "example" or "exemplary" is not necessarily to be construed as preferred or advantageous over other implementations, aspects, or features. Alternative implementations, aspects, or features can be utilized, and other changes can be made, without departing from the scope of the subject matter presented herein.

Thus, the example implementations described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

1. EXAMPLE ROBOTIC DEVICES

Figure 1:
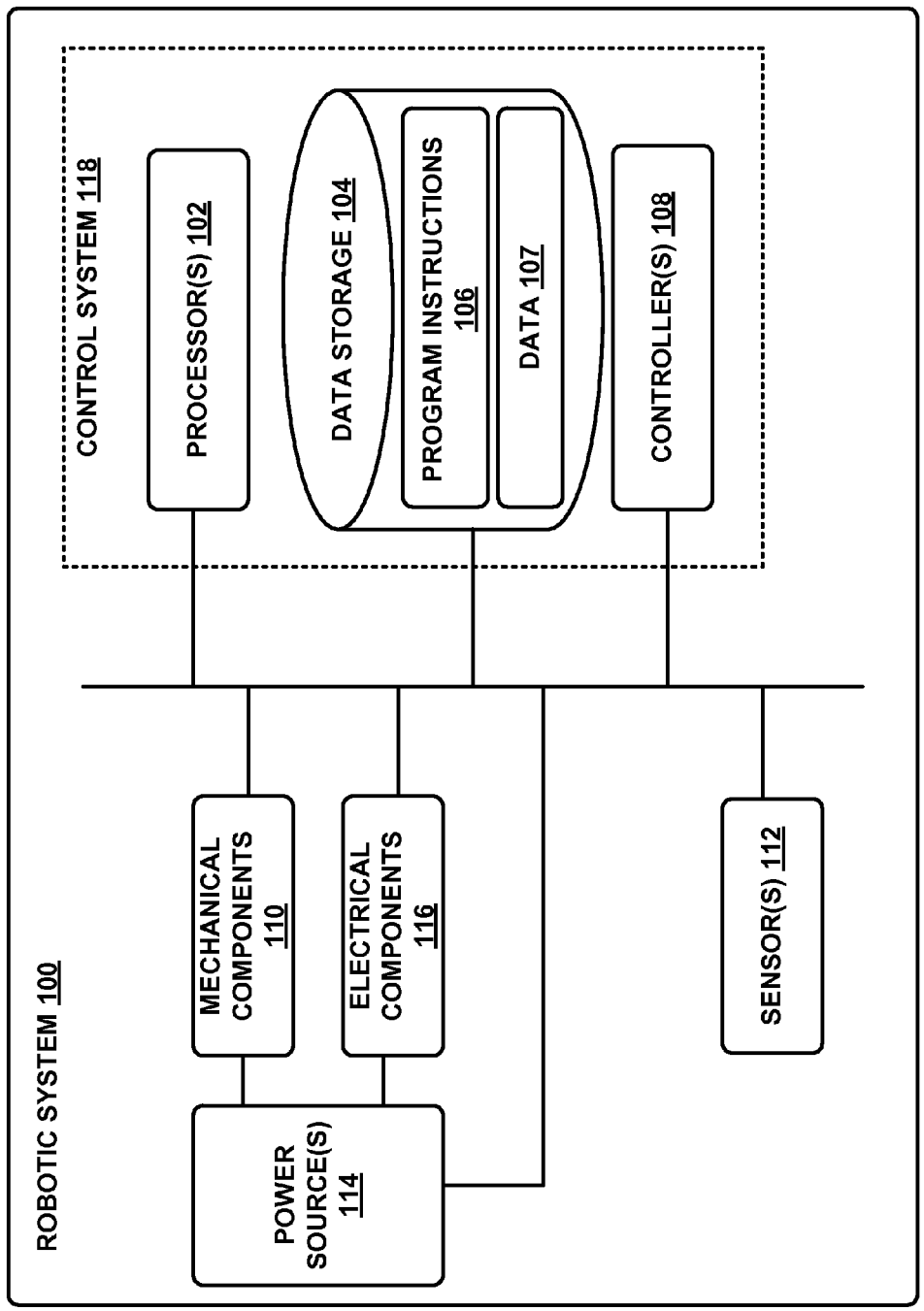
FIG. 1 depicts robotic system, according to example implementations.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
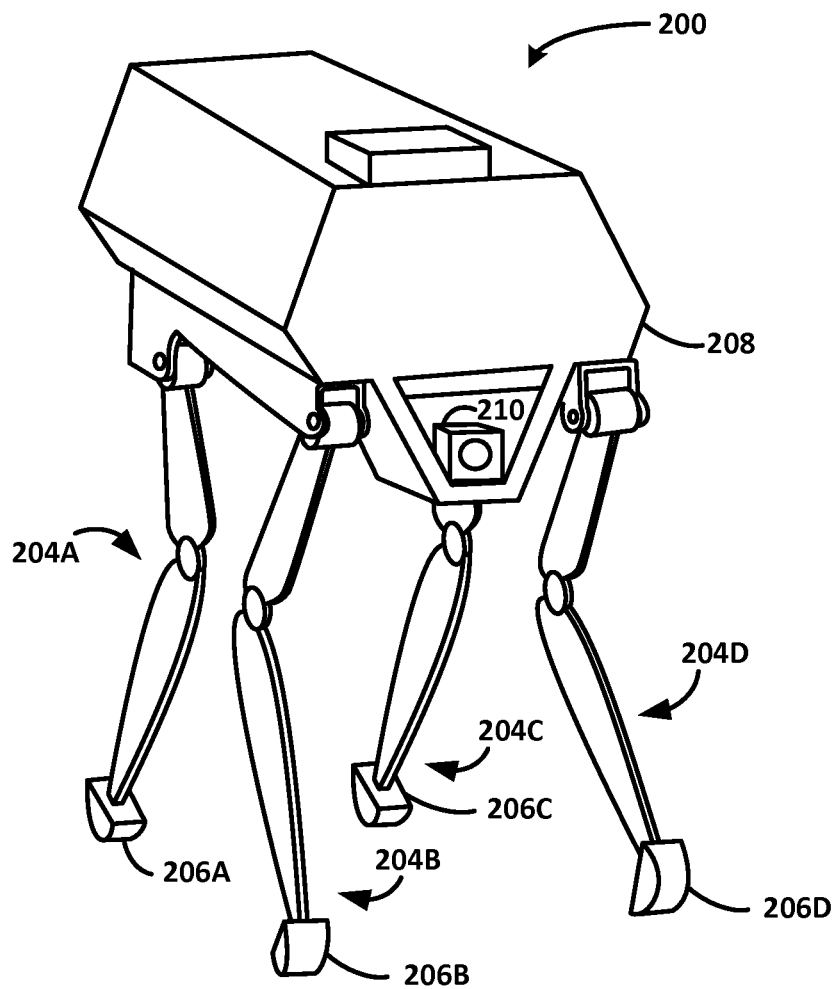
FIG. 2 depicts a quadruped robot, according to example implementations.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
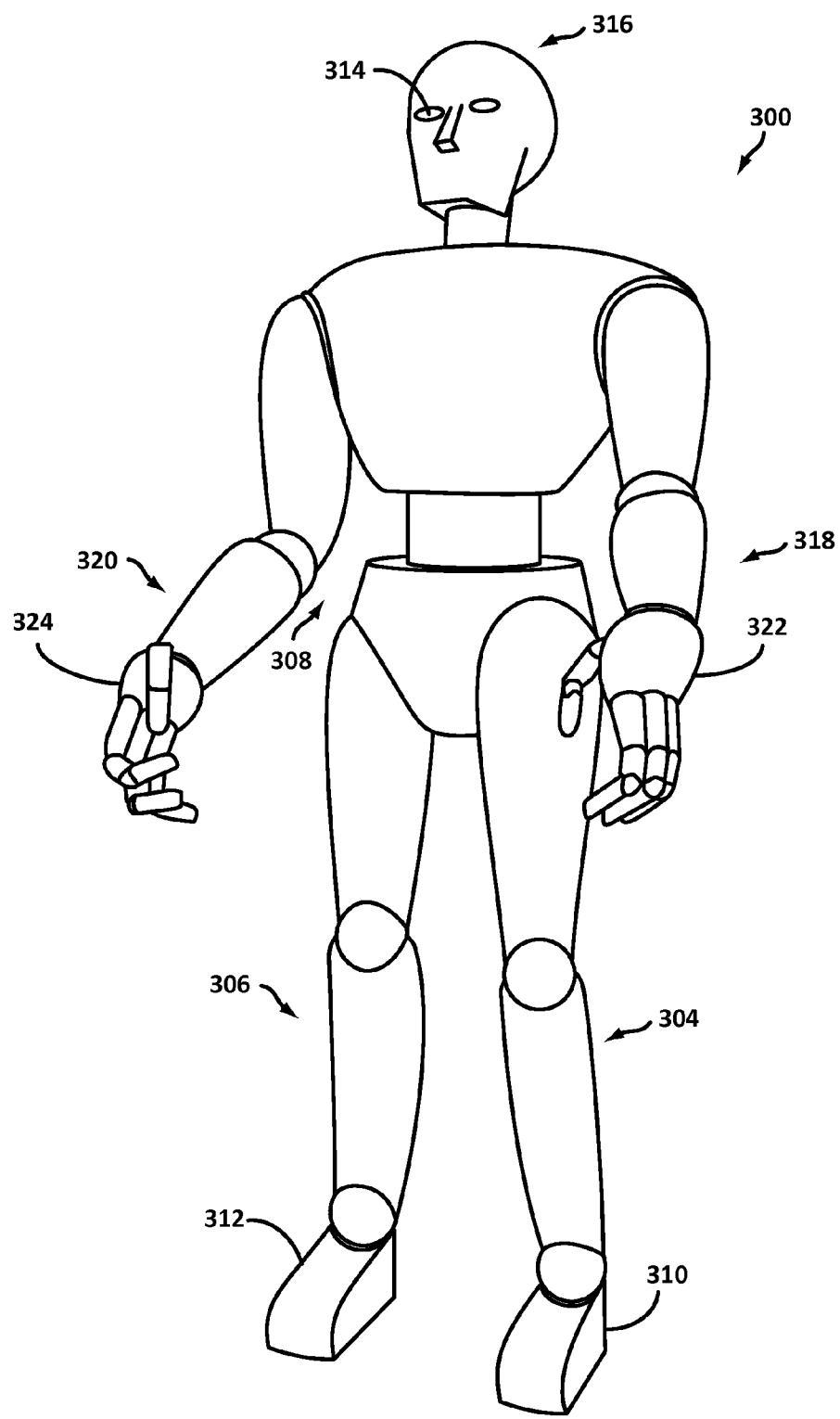
FIG. 3 depicts a biped robot, according to example implementations.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

2. EXAMPLE GAITS OF LEGGED ROBOTS

This section describes example gaits of legged robots. Although quadruped gaits are described for purpose of example, the implementations herein can support gaits of robots with varying numbers of legs, including bipeds, tripods, hexapods, etc. Gaits can differ in a variety of ways, and different gaits may produce different styles of locomotion.

As noted above, a gait of a robot may encompass a cyclic pattern of leg movements that produce locomotion through a sequence of foot contacts with a surface (e.g., a ground surface). Additionally, acyclic gaits define transitions of the robot's locomotion between two gaits, and recovery gaits define touchdown timings and positions for the feet that cause the legged robot to recover from deviations from a cyclic or acyclic gait.

Quadruped robots may support a number of gaits including, but not limited to, standing, walking, trotting, cantering, galloping, and bounding. Each of these gaits involves a different pattern of foot placements on a surface and timings thereof. In order to achieve a particular gait, the robot may be instructed to actuate its leg members and/or leg joints in accordance with the particular gait.

For purposes of simplicity, three example cyclic quadruped gaits are described in detail below: standing, walking, and trotting. Nonetheless, quadruped robots may support other gaits, and may also support multiple variations of gaits. For instance, a robot may support various combinations of velocities (e.g., 1.5 miles per hour (MPH), 2.0 MPH, 2.5 MPH, 3.0 MPH, 3.5 MPH, etc.) and directions (e.g., forward, sidestep left, sidestep right, backward, etc.) for a walking gait. Despite their similarities, the walking gaits for each velocity may be considered to be different gaits. The velocities discussed herein may be center-of-mass (COM) velocities of a robot measured by, for instance, an IMU. These velocities may be a combination of x-direction and y-direction velocities, such as a speed and angle representation of a velocity vector. But other types of velocities (and/or velocity sensors) may be used.

A stand gait may be considered to be a "gait" of a quadruped, even though the robot's velocity is expected to be at or near zero when standing. Further, a standing quadruped has all four of its feet in contact with a surface. In some situations, a standing quadruped may exhibit some nominal velocity. For example, the quadruped may need to exert force to correct its balance, and/or move its center of mass (COM) in one direction or another to maintain a particular stance. Thus, a quadruped may be considered to be standing even if its velocity is less than a particular threshold, such as 0.1 MPH.

A walk may involve the quadruped moving at a velocity of approximately 0.5 to 5.5 MPH, though slower and/or faster walks may be possible. An example leg movement sequence for a walking quadruped is moving the left rear leg, then the left front leg, then the right rear leg, and then the right front leg in a four-beat pattern. The quadruped may alternate between having two and three of its feet in contact with a surface at any given time.

Figure 4:
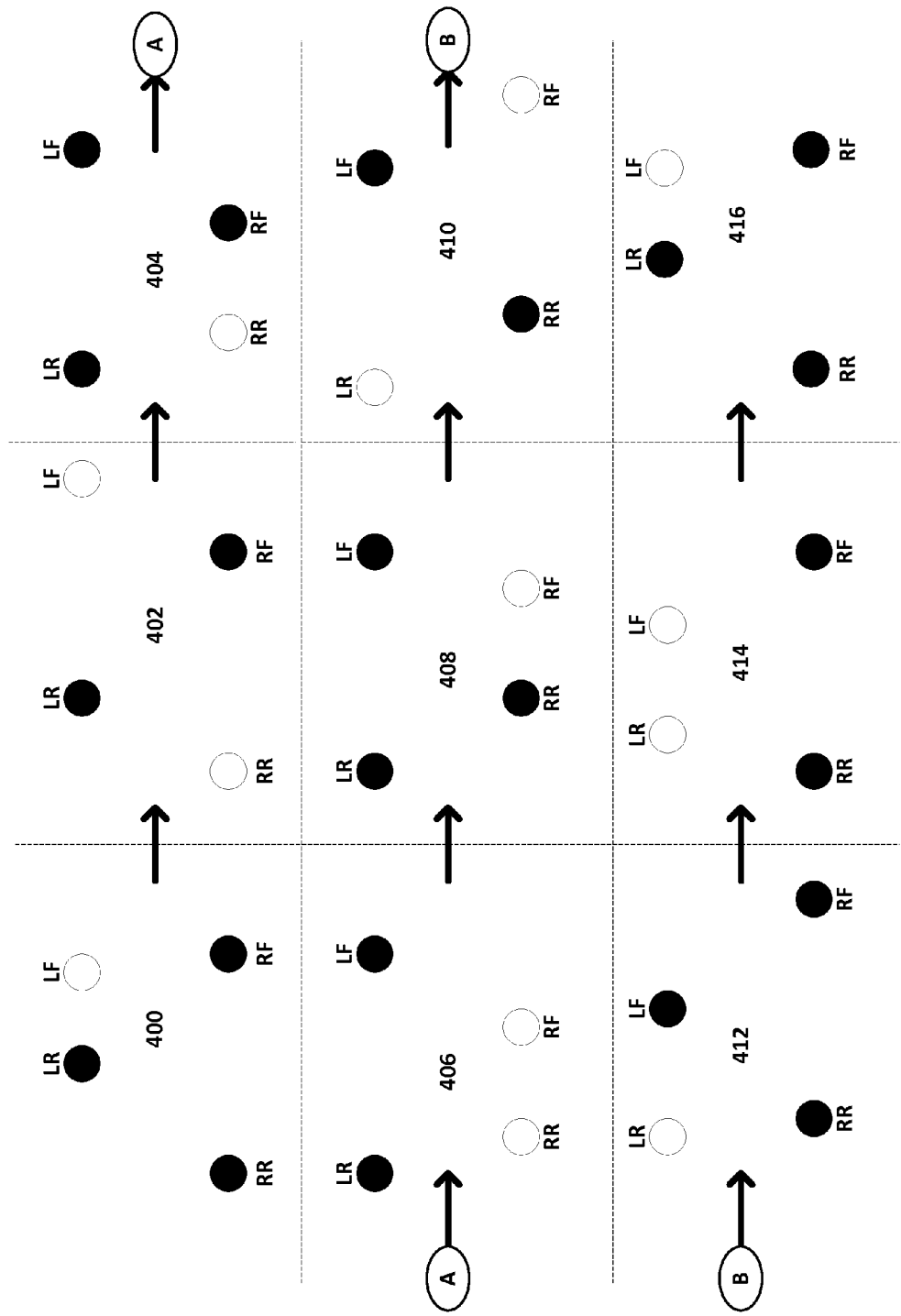
FIG. 4 depicts a sequence of footfall patterns for a walk gait of a quadruped robot, according to example implementations.

An example sequence of footfall patterns for a walking quadruped is shown in FIG. 4. In each pattern 400, 402, 404, 406, 408, 410, 412, 414, and 416, a foot of the quadruped that is in contact with the surface is represented with a solid black circle. A foot that is not in contact with the surface (e.g., in a swing phase) is represented as a white circle with a black outline. Further, the abbreviations LF, RF, LR and RR represent the quadruped's left front foot, right front foot, left rear foot, and right rear foot, respectively. Additionally, the quadruped is assumed to be moving to the right in each pattern of FIG. 4.

Starting at pattern 400, the quadruped has its right front, left rear, and right rear feet on the surface, while its left front foot is swinging. In pattern 402, the left front foot continues to swing while the right rear foot is lifted off the surface and begins to swing. In pattern 404, the left front foot touches down while the right rear foot continues its swing. In pattern 406, the right front foot lifts off while the right rear foot again continues its swing. In pattern 408, the right rear foot touches down while the right front foot continues its swing. In pattern 410, the left rear foot lifts off while the right front foot continues its swing. In pattern 412, the right front foot touches down while the left rear foot continues its swing. In pattern 414, the left front foot lifts off while the left rear foot continues its swing. In pattern 416, the left rear foot touches down while the left front foot continues its swing.

Notably, pattern 416 may be identical or similar to pattern 400. Thus, the sequence of patterns 400, 402, 404, 406, 408, 410, 412, 414, and 416 may repeat as the robot walks. Regardless, the number of feet in contact with the surface at any one time is either 2 or 3.

A trot may involve the quadruped moving at a velocity of approximately 1.0 MPH to 10 MPH, though slower and/or faster trots may be possible. One possible characteristic of a trot is that diagonal pairs of feet are moved in unison according to a two beat pattern.

Figure 5A:
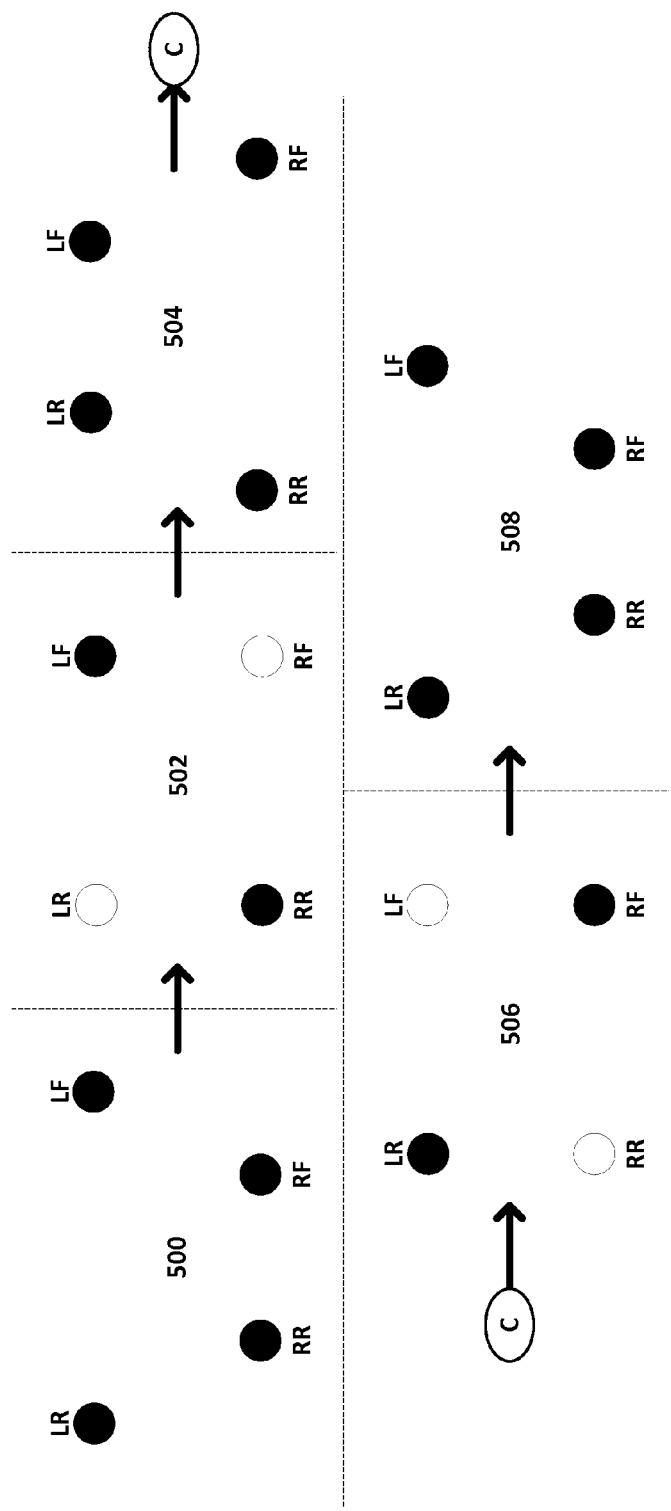
FIG. 5A depicts a sequence of footfall patterns for a trot gait of a quadruped robot, according to example implementations.
Figure 5B:
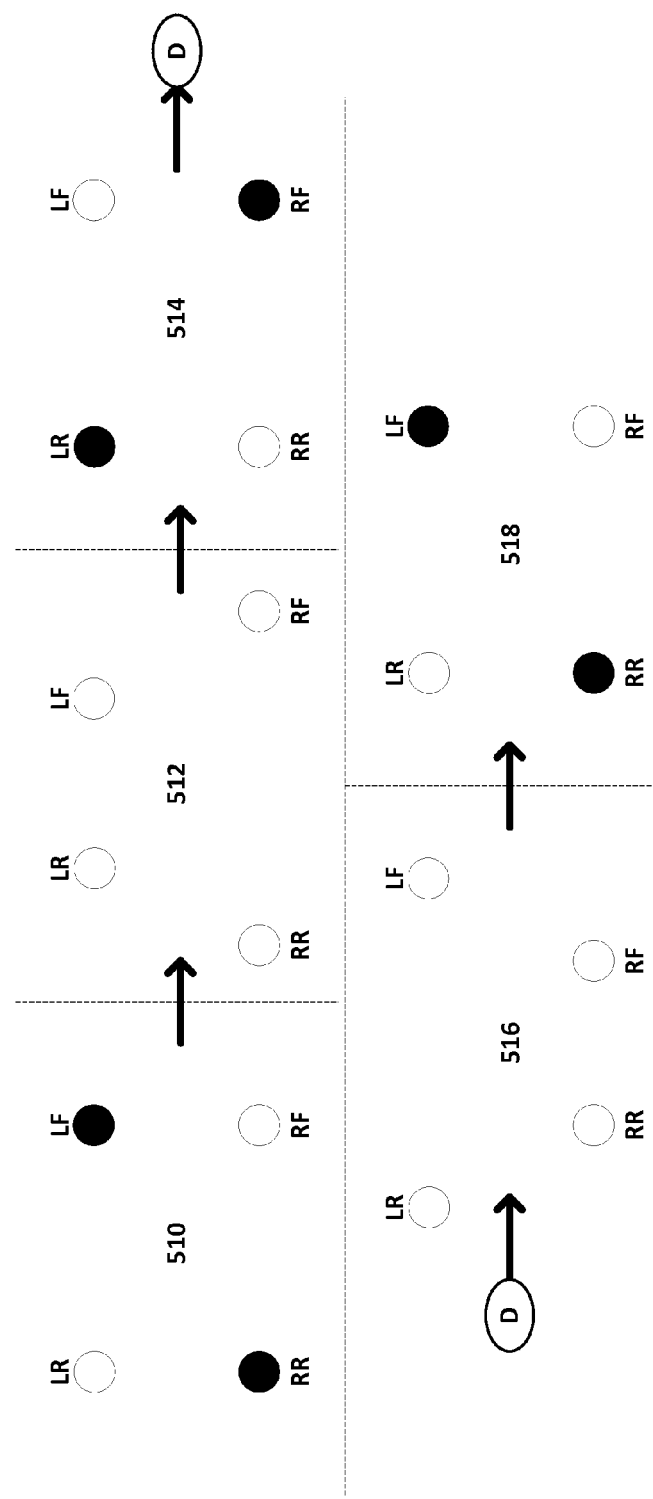
FIG. 5B depicts another sequence of footfall patterns for a trot gait of a quadruped robot, according to example implementations.

Example sequences of footfall patterns for a trotting quadruped are shown in FIGS. 5A and 5B. FIG. 5A shows a trotting footfall pattern sequence in which all four feet can be on the surface simultaneously, and FIG. 5B shows a trotting footfall pattern sequence in which all four feet can be off the surface simultaneously. For sake of convenience, the trotting footfall pattern sequence of FIG. 5A may be referred to as a "slow trot," while the trotting footfall pattern sequence of FIG. 5B may be referred to as a "fast trot."

Starting at pattern 500 of FIG. 5A, the quadruped has all four of its feet on the surface. In pattern 502, the right front and left rear feet are lifted off the surface and begin to swing. In pattern 504, all four feet are again on the surface, but in an arrangement that is the mirror image of pattern 500. In pattern 506, the left front and right rear feet are lifted off the surface and being to swing. In pattern 508, all four feet are once more on the surface.

Notably, pattern 508 may be identical or similar to pattern 500. Thus, the sequence of patterns 500, 502, 504, 506, and 508 may repeat as the robot walks. Regardless, the number of feet in contact with the surface at any one time is either 2 or 4.

Starting at pattern 510 of FIG. 5B, the quadruped has its left front and right rear feet on the surface, while its right front and left rear feet are swinging. In pattern 512, the left front and right rear feet are lifted off the surface, and all four feet are swinging. In pattern 514, the right front and left rear feet touch down, while the left front and right rear feet are still swinging. In pattern 516, the right front and left rear feet are lifted off the surface, and all four feet are swinging. In pattern 518, the left front and right rear feet touch down while the right front and left rear feet are swinging.

Notably, pattern 518 may be identical or similar to pattern 510. Thus, the sequence of patterns 510, 512, 514, 516, and 518 may repeat as the robot walks. Regardless, the number of feet in contact with the surface at any one time is either 0 or 2.

The patterns of FIGS. 4, 5A, and 5B are nominal, in the sense that they may change based on the robot's state or environment. For instance, a robot may accelerate or delay the touchdown of a foot to accommodate a rise or dip in the surface. Further, a robot may alter its gait to account for a disruption to its COM, or to avoid an obstacle. Thus, the gait patterns of these figures are merely for purposes of example, and not intended to limit the implementations herein.

In addition to walking and trotting a quadruped may support other gaits, such as cantering, galloping, bounding, and so on. Further, the quadruped may support moving in various directions according to its supported gaits, such as forward, backward, sidestepping left, and sidestepping right.

As noted above, the quadruped may also support acyclic gaits that define footfall patterns that transition the quadruped between two gaits, such as two cyclic gaits. Unlike cyclic gaits which may repeat for an arbitrary period of time, transitions are finite behaviors that switch between gaits. For two gaits that have intersecting states (e.g., a particular robot state in terms of joint angles of the robot's legs exists in both gaits) transitioning between the gaits may involve an instantaneous switch from one gait to the other during one of these intersecting states. But if two gaits do not have intersecting states, the transition may continue locomotion, but change the robot's parameters from one gait to another over a finite period of time, while keeping the robot in valid states throughout the transition.

Also as noted above, the quadruped may support recovery gaits that define footfall patterns that cause the legged robot to recover from deviations from a cyclic or acyclic gait. For instance, if the quadruped departs from a cyclic or acyclic gait, perhaps due to a collision with an object or attempted avoidance of such a collision, the quadruped may adopt a recovery gait. In some cases, a recovery gait may involve swinging a leg faster or slower than normal, as long as the robot remains within a valid state. If such a leg were to move faster than normal, it would touch down earlier. This may help place the quadruped in a different gait than it was previously. Alternatively, if a leg is slowed or paused, the quadruped may also be able to adopt a different gait.

3. EXAMPLE GAIT CONTROLLERS AND ORDERED LISTS THEREOF

Given that some robots may support a large number of gaits and variations thereof, software modules to support these gaits may be organized into discrete gait controllers. Each gait controller may map the robot's instantaneous state to output parameters, and may be associated with zero or more validity checks. The state of the robot may include the robot's velocity (e.g., COM velocity) and position, as well as joint angles and joint torques for the legs of the robot, for instance. This state may be sensed by, for example, an IMU, joint angle sensors, and/or actuators among other possibilities. The output parameters may include prospective footstep locations, as well as desired joint torques and/or joint angles of the robot's legs so that the robot can achieve the prospective footstep locations over a particular time horizon (e.g., the next 1-5 seconds).

A validity check associated with a gait controller is a test to make sure that the robot is capable of achieving the desired gait based on its current state. As an example, if a robot is running, it might not be able to immediately transition to a standing gait without a loss of stability (e.g., the robot will fall over). In addition to the velocity of the robot, the validity checks may include the number of feet in contact with a surface, that the robot's pitch and roll are within certain bounds, and that the gait will not lead to the robot attempting to place one or more of its feet in unobtainable positions.

For each possible target gait, gait controllers may be ordered in a list such that the gait controller for the target gait is at the beginning (e.g., the top) of the list. Further, additional gait controllers for other gaits may be placed in the list based on how rapidly the robot can transition from one of these gaits to the target gait. As an illustrative example, FIG. 6A depicts a list 600 for a target gait of standing (which will be referred to as the "stand list").

Figure 6A:
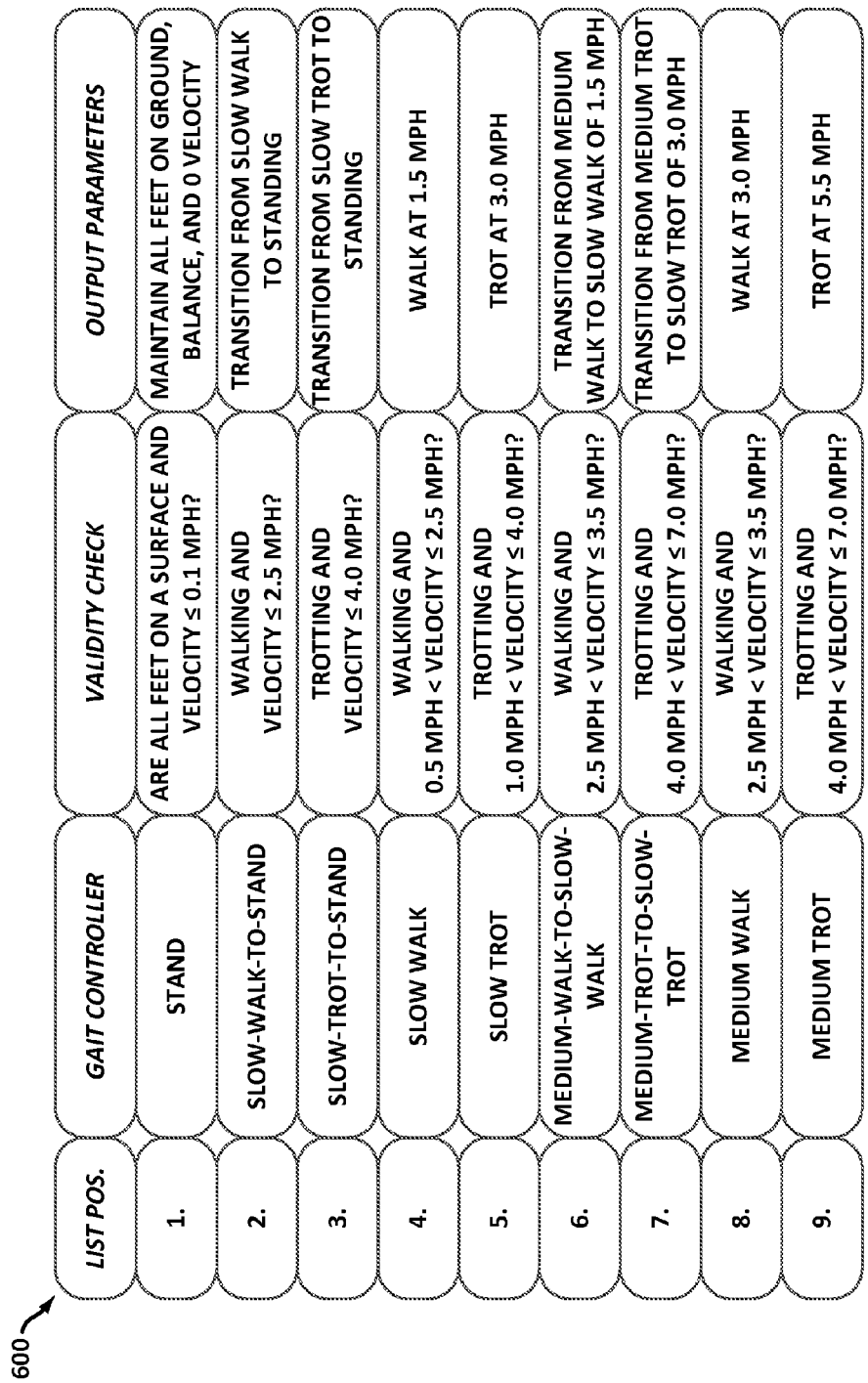
FIG. 6A depicts a list of gait controllers, according to example implementations.

In FIG. 6A, nine gait controllers are ordered in a list 600, starting with the stand gait controller. Thus, the robot may be operating according to any of the defined gaits, and the robot may have decided, or been instructed, to stand. As a result, the stand gait is the target gait. For purposes of simplicity, the robot is assumed to support four cyclic gaits in addition to standing: a slow walk at 1.5 MPH, a slow trot of 3.0 MPH, a medium walk at 3.0 MPH, and a medium trot at 5.5 MPH. The robot is also assumed to support four acyclic gaits: slow-walk-to-stand, slow-trot-to-stand, medium-walk-to-slow-walk, and medium-trot-to-slow-trot.

In full generality, a robot may support any number of gaits. For instance, stand list 600 of FIG. 6A may include up to 10 or more walking gaits of various velocities, as well as up to 10 or more trotting gaits of various speeds. In some cases, the respective velocities may be close to one another to facilitate smooth transitions between the gaits. As an example, walking gaits at 0.5 MPH, 1.0 MPH, 2.0 MPH, 2.5 MPH, 3.0 MPH, 3.5 MPH, 4.0 MPH, and 4.5 MPH may be defined. Further, acyclic gaits transitioning between various pairs of these walking gaits may be defined.

Not shown in FIG. 6A are gait controllers for additional gaits, such as canter, gallop, and bound, as well as recovery gaits. However, these omissions were made in order to simplify FIG. 6A. A stand list in accordance with the implementations herein may include any number of gait controllers (e.g., dozens, hundreds, etc.).

If a robot is in any of the non-standing gaits, stand list 600 of FIG. 6A can be used to incrementally instruct the robot to smoothly attain the stand gait. Starting at the beginning of stand list 600 (list position 1), the list may be traversed in order. For each gait controller, the associated validity check is performed. If the validity check passes, then the robot is instructed to operate according to the gait controller's output parameters. If the validity check fails, then the next gait controller in the list is evaluated accordingly, until a valid gait controller is found.

In FIG. 6A the validity checks are related to the instantaneous state and velocity of the robot for purposes of simplicity. In full generality, other validity checks may be included. Further, each gait controller list may include a default controller in the last position of the list. This final gait controller instructs the robot to operate according to a fallback behavior if the validity checks of all other gait controllers fail. For instance, the gait controller at the end of the stand list may have no associated validity checks (so that the associated gait is always valid) and the output parameters may effectively lock the joint positions of the robot. While this behavior might not be ideal in some situations, it provides a behavior for the robot when all other gait controllers fail.

An algorithmic process for traversing a list of gait controllers will be presented below in the context of FIG. 8. But for purposes of presenting stand list 600, the following high-level examples are provided. In both examples, the stand list 600 is traversed from the beginning until an appropriate gait controller is determined.

In one example, if a robot is operating according to the slow walk gait of 1.5 MPH, the validity check of the stand gait controller is tested first, but fails. However, the validity check of the slow-walk-to-stand gait controller will pass, because the robot is walking (e.g., with 2 or 3 feet on the surface) at less than 2.5 MPH. The output parameters of the slow-walk-to-stand gait controller instruct the robot to operate according to the slow-walk-to-stand-gait, which transitions the robot to standing. Stand list 600 is traversed again from the beginning and this time the validity check for the stand gait controller passes, because the robot is standing (all four feet on the surface with little or no velocity). Thus, the desired stand gait is achieved In another example, if the robot is operating according to the medium trot gait, stand list 600 instructs the robot to switch to the medium-trot-to-slow-trot gait. Once in the medium-trot-to-slow-trot gait, stand list 600 instructs the robot to operate according to the slow trot gait. Once in the slow trot gait, stand list 600 instructs the robot to operate according to the slow-trot-to-stand gait. Once in the slow-trot-to-stand gait, stand list 600 instructs the robot to operate according to the stand gait.

In general, any particular gait controller (but not the target gait controller) is operable to change the state of the robot such that the changed state at least partially satisfies the validity check of one or more gait controllers that appear in the list before the particular gait controller. In this way, each list may also be represented as a hierarchy of gait controllers.

Figure 6B:
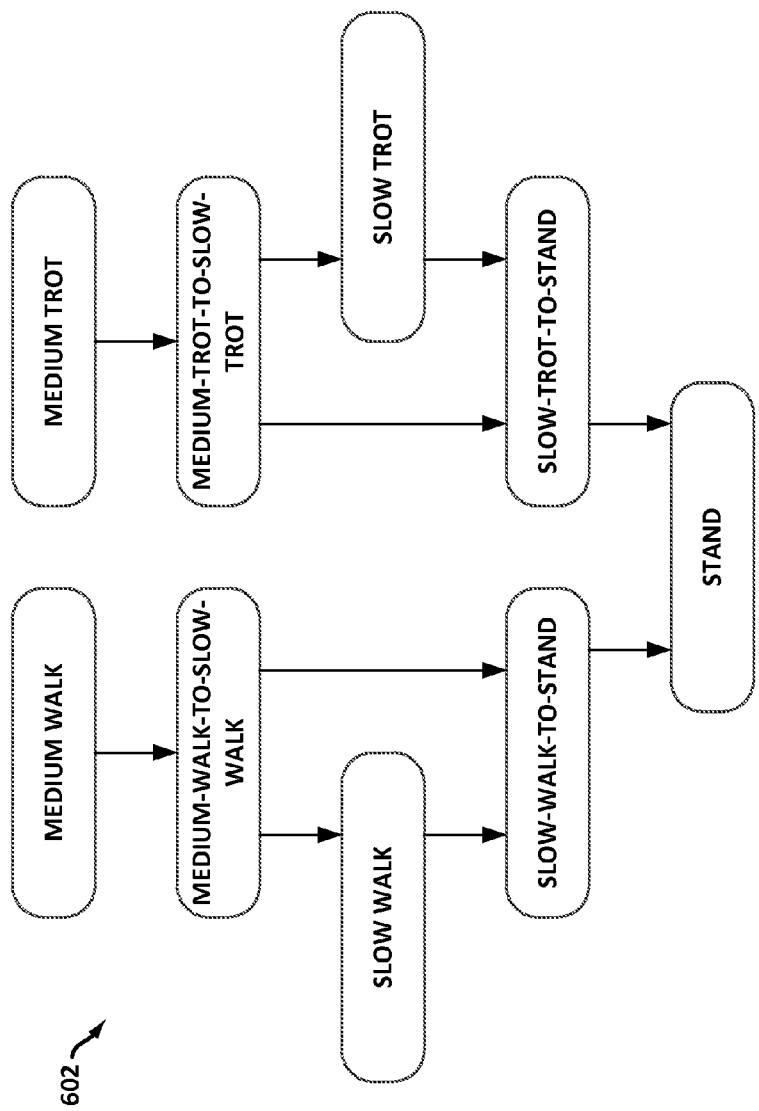
FIG. 6B depicts a hierarchical view of the gait controllers of FIG. 6A, according to example implementations.

For instance, FIG. 6B presents a hierarchical view of stand list 600. In particular, hierarchy 602 illustrates how a robot operating according to any gait in stand list 600 can transition to the stand gait. As just one example, a robot operating according to the medium walk gait may transition to the acyclic medium-walk-to-slow-walk gait, then to the slow walk gait, then to the slow-walk-to-stand gait, and then to the stand gait. As noted above, an algorithmic process for traversing a list of gait controllers will be presented below in the context of FIG. 8.

FIG. 6B indicates that a robot can switch directly from the medium-walk-to-slow-walk gait to the slow-walk-to-stand gait without operating according to the slow walk gait. Similarly, a robot can switch directly from the medium-trot-to-slow-trot gait to the slow-trot-to-stand gait without operating according to the slow trot gait. In some implementations, however, acyclic gaits always transition between pairs of cyclic gaits, and thus transitioning directly from one acyclic gait to another might not be supported. Instead, between acyclic gaits, the robot may spend at least a nominal amount of time (e.g., a few milliseconds or more) operating according to a cyclic gait.

Figure 7A:
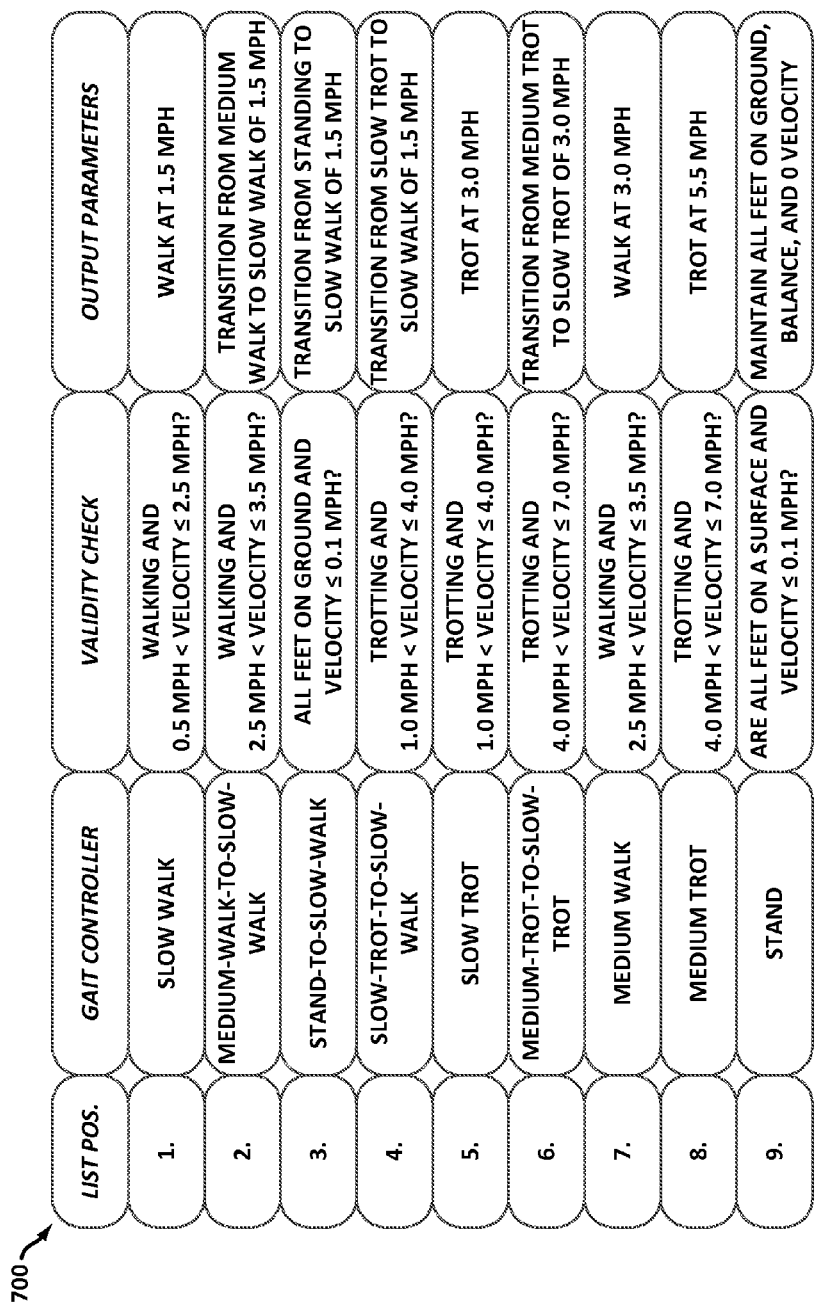
FIG. 7A depicts another list of gait controllers, according to example implementations.

As another illustrative example, FIG. 7A depicts a list 700 for a target gait of slow walk (which will be referred to as the "slow walk list"). In FIG. 7A, nine gait controllers are ordered starting with the slow walk gait controller. Thus, the robot may be operating according to any gait, and the robot may have decided, or been instructed, to operate according to the slow walk gait. Therefore, the slow walk gait is the target gait. The robot is assumed to support four cyclic gaits in addition to slow walk: standing with a substantive zero velocity, a slow trot of 3.0 MPH, a medium walk at 3.0 MPH, and a medium trot at 5.5 MPH. The robot is also assumed to support four acyclic gaits: medium-walk-to-slow-walk, stand-to-slow-walk, slow-trot-to-slow-walk, and medium-trot-to-slow-trot. Other gaits not shown in FIG. 7A may also be supported.

Like FIG. 6A, in FIG. 7A the validity checks are related to the instantaneous state and velocity of the robots for purposes of simplicity. In full generality, other validity checks may be included.

Figure 7B:
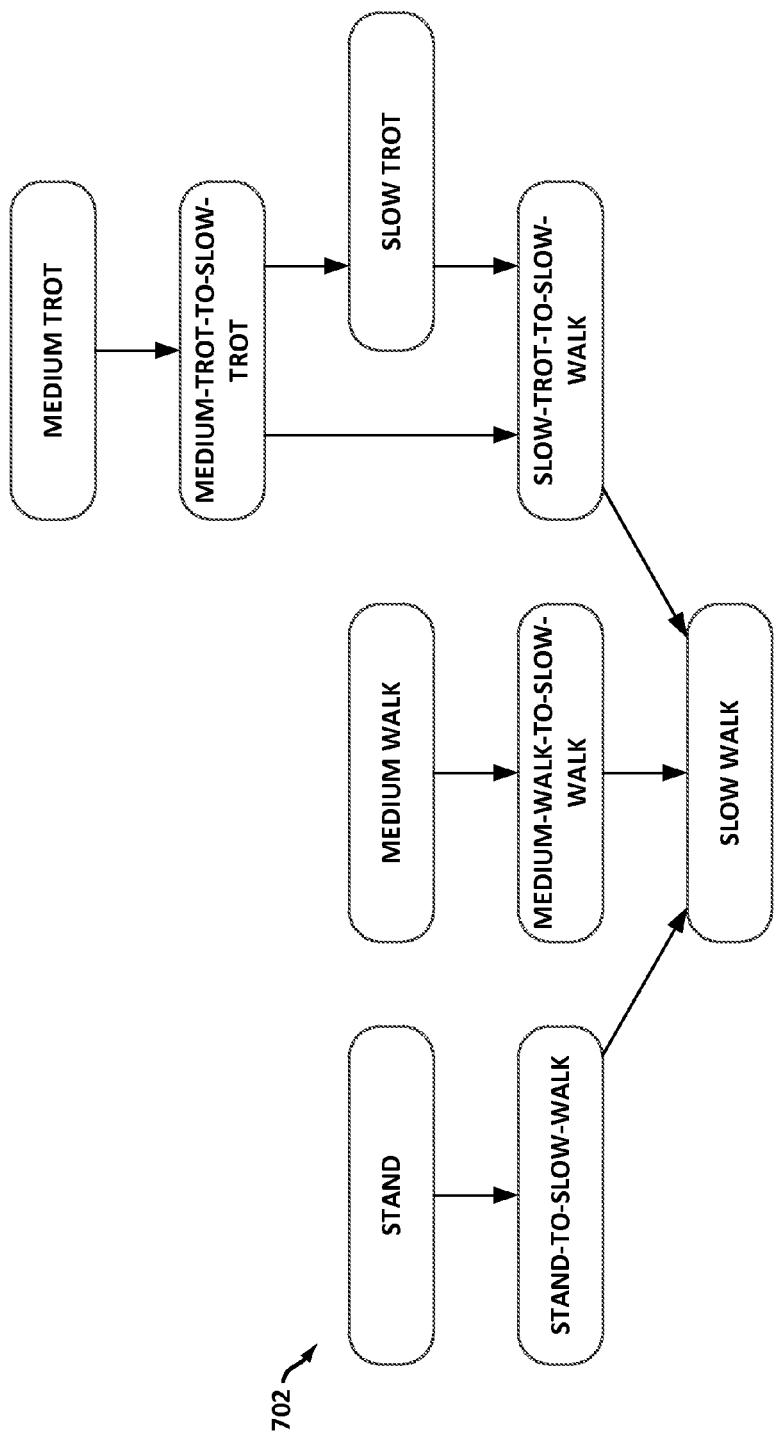
FIG. 7B depicts a hierarchical view of the gait controllers of FIG. 7A, according to example implementations.

As was the case for the stand list, any particular gait controller (but not the target gait controller) is operable to change the state of the robot so that the changed state at least partially satisfies the validity check of one or more gait controllers that appear in the list before the particular gait controller. To that point, FIG. 7B presents a hierarchical view of slow walk list 700. In particular, hierarchy 702 illustrates how a robot operating according to any cyclic gait in slow walk list 700 can transition to the slow walk gait. As just one example, a robot operating according to the medium trot gait may transition to the acyclic medium-trot-to-slow-trot gait, then to the slow trot gait, then to the slow-trot-to-slow-walk gait, and then to the slow walk gait.

4. EXAMPLE TRAVERSAL OF A LIST OF GAIT CONTROLLERS

Figure 8:
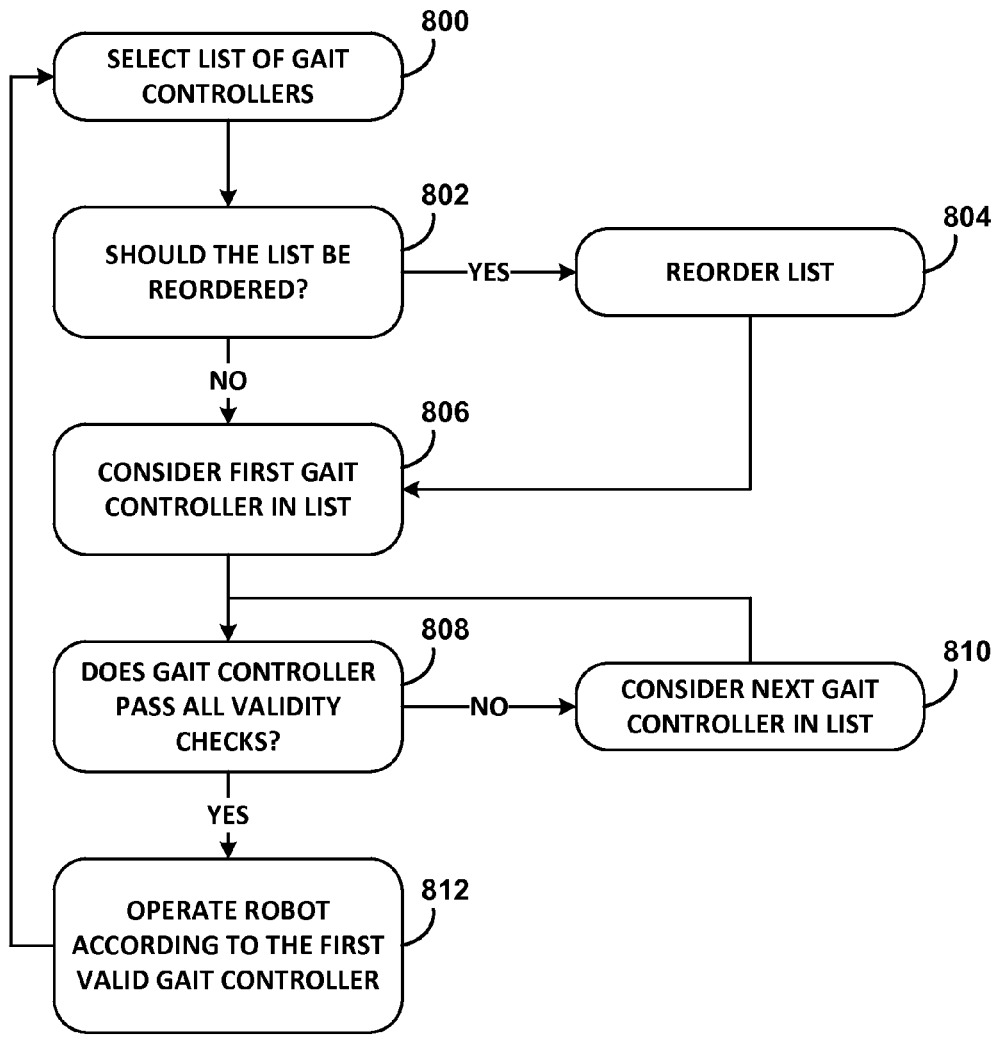
FIG. 8 is a flow chart, according to example implementations.

FIG. 8 is a flow chart depicting an algorithmic process for traversing a list of gait controllers. This process can be applied to any list of gait controllers, such as the stand list of FIG. 6A or the slow walk list of FIG. 7A.

At block 800, a list of gait controllers may be selected. The selection may be based on a particular target gait for the robot. For instance, if the robot's target gait is standing, the stand list of FIG. 6A may be selected. If the robot's target gait is slow walk, the slow walk list of FIG. 7A. Other target gaits and associated lists of gait controllers may be supported.

The target gait may, in turn, be based on one or more input commands. The robot may receive these commands from an external remote control such as a joystick, or may generate the commands itself.

At block 802, a determination may be made whether to reorder the selected list. If so, at block 804 the list may be reordered. List reordering is discussed in more detail in the following section. Blocks 802 and 804 are optional, and may be omitted.

At block 806, the first gait controller in the list is considered. This is the target gait controller that would serve to operate the robot according to the target gait.

At block 808, a determination is made whether the target gait controller passes all associated validity checks. As noted earlier, the validity checks may be based on the state (e.g., the instantaneous state) of the robot, and possibly other factors as well. In particular, a validity check may consider the current gait of the robot as well as the velocity of the robot. If these factors are within the acceptable bounds of the gait controller, then the gait controller passes the validity check. If not, the gait controller fails the validity check.

Thus, if the gait controller passes the validity check, then at block 812, the robot is operated according to this gait controller. If the gait controller fails the validity check, then at block 810, the next gait controller in the list is considered. In this way, the list is traversed in order until a valid gait controller is found, and the robot is operated according to the first valid gait controller.

Since the validity checks of more than one gait controller may pass for a particular robot state and velocity, the ordering of the gait controllers in the list can have a significant impact on the robot's ultimate behavior. Therefore, the list may be ordered so that operating the robot according to gait controllers other than the target gait controller eventually (directly or indirectly) result in the robot state and velocity passing the validity check of the target gait controller. Thus, gait controllers lower in the list may be operable to change the state of the robot such that the changed state at least partially satisfies the validity check of one or more gait controllers that appear higher in the list.

The operations of FIG. 8 may be performed continuously, periodically, or from time to time. In some implementations, the operations of FIG. 8 may continuously repeat in a loop tens or hundreds of times per second. This may result in the robot switching gait controllers mid-stride one or more times. Alternatively, the robot may maintain the same gait for one or more full cycles of a gait. Other possibilities exist.

The following example illustrates the operations of FIG. 8 applied to the stand list of FIG. 6A. In this example, the robot is assumed to be a quadruped moving according to a 5.5 MPH trot. The robot may receive a command to transition to a standing position. As a result, the robot may select the stand list of FIG. 6A because the stand gait is the target gait of this list.

Starting at list position 1, the robot considers the associated gait controller. This gait controller, which is for the target stand gait, requires that all four of the robot's feet are on a surface and that the robot's velocity is less than or equal to a nominal velocity of 0.1 MPH. This non-zero nominal velocity allows the robot's COM to sway to a small extent as long as the robot maintains a four-footed contact with the surface. In any case, the validity check fails because the robot is moving with a velocity that is greater than 0.1 MPH.

The robot then considers the slow-walk-to-stand gait controller at list position 2. This gait controller requires that the robot is walking and that the robot's velocity is less than or equal to 2.5 MPH. The validity check for the slow-walk-to-stand gait controller fails because the robot's velocity is too high. This validity check may also fail because it requires that either exactly two or exactly three of the robot's feet are in contact with the surface (while some phases of the trot gait may involve exactly two feet in contact with the surface, other phases do not).

The robot then considers the slow-trot-to-stand gait controller at list position 3. This gait controller requires that the robot is trotting (e.g., with either one diagonal pair of feet on the surface while the other diagonal pair of feet are swinging, all four feet on the surface, or all four feet off of the surface) at a velocity less than or equal to 4.0 MPH. While the robot is trotting, its velocity is once again too high to pass this validity check.

The robot then considers the slow walk gait controller at list position 4, the validity check of which fails because the robot's velocity is too low, and may additionally fail because the robot is trotting. The validity check of the slow trot gait controller at list position 5 also fails because the robot's velocity is too high, as does the validity check of the medium-walk-to-slow-walk gait controller at list position 6.

However, the validity check of the medium-trot-to-slow-trot gait controller at list position 7 passes because the robot is trotting with a velocity that is greater than 4.0 MPH and less than or equal to 7.0 MPH. Therefore, the robot applies the output parameters of the medium-trot-to-slow-trot gait controller. For instance, these output parameters may define a series of leg actuation states and/or leg joint angles that transition the robot from its current trotting speed to a slow trot of 3.0 MPH.

Once the robot achieves the slow trot of 3.0 MPH, the robot traverses the list once again from the beginning. Thus, the robot considers the stand gait controller at list position 1. The validity check of this gait controller fails because the robot's velocity is too high. Next, the robot considers the slow-walk-to-stand gait controller at list position 2. The associated validity check fails for this gait controller as well, once again because the robot's velocity is too high.

The validity check of the slow-trot-to-stand gait controller passes, however, and the robot applies the associated output parameters. For instance, these output parameters may define a series of leg actuation states and/or leg joint angles that transition the robot from its current trotting speed to a standing position with zero or near-zero velocity.

After doing so, the robot continues to iterate traversals of the list, each traversal starting at the beginning of the list. As long as the robot remains standing, the validity check for the stand gait controller will pass, and the robot will remain in the standing gait (which is also the target gait). If the robot experiences a disturbance, for instance if its footing slips or it is pushed off balance, the robot may apply a different gait controller to regain its standing gait. For example, a recovery gait controller (not shown in FIG. 6A) may be used.

On the other hand, if the robot determines that it should move according to a particular gait (e.g., a walk or trot), the robot may select a different list (such as the list of FIG. 7A), and proceed according to one or more gait controllers in the selected list.

5. ADDITIONAL FEATURES

In addition to the features and operations described above, the implementations herein may include the additional features and/or operations described in this section. Nonetheless, these features are optional, and may or may not be included.

A. List Reordering

As noted in the previous section, a list of gait controllers may be reordered. For instance, a first intermediate gait controller and a second intermediate gait controller may be identified. Neither of these gait controllers are the target gait controller, but each can be used by the robot to achieve the target gait. Possibly based on an instantaneous state of the robot, the first intermediate gait controller may be selected as more favorable than the second intermediate gait controller for achieving the target gait. The list may be reordered such that the first intermediate gait controller is before the second intermediate gait controller in the list.

As an example, suppose that a standing quadruped is instructed to begin walking forward. In order to do so, the quadruped selects a foot to move first. In principle, any of the quadruped's four feet could be selected and would work equally well. Thus, the quadruped may be configured to always step first with its left front foot. However, if the robot's instantaneous stance is such that the left front foot is fully extended forward, the robot might not be able to step further forward with that foot. Therefore, in this situation, the robot should step first with one of the other three feet.

In order to facilitate making such determinations, a walk list may include four stand-to-walk controllers, each moving a different foot first. Based on its instantaneous leg actuation states and/or leg joint angles, the robot may assign a cost to each. Particularly, this cost may be higher for the fully extended left front foot than the other three feet. These four gait controllers may be sorted in increasing order of cost in the list so that a gait controller that steps first with a foot other than the front left is preferentially chosen.

B. Further Validity Checks

In addition to validity checks involving the gait of the robot and the velocity of the robot, the pitch and/or roll of the robot may be considered as well. When performing certain tasks, such as traveling on uneven terrain, the robot's pitch and roll may deviate from zero-degree values. Such deviations may be detected by the robot's IMU, or some other sensor.

For instance, the pitch of the robot may be 10 or 20 degrees when climbing a hill, or the roll of the robot may be −10 or −20 degrees when traveling sideways on a hill. In order to maintain stability of the robot, some validity checks may include limits on the pitch and/or roll of the robot. These limits might include acceptable pitch and/or roll ranges of −10 degrees to 10 degrees, −20 degrees to 20 degrees, −40 degrees to 40 degrees, and so on. If the robot's pitch or roll falls outside of an acceptable range, a recovery gait controller may be selected that operates the robot to stabilize its pitch and/or roll.

Additional validity checks may avoid situations where the robot attempts to step out further than its foot can reach. For instance, consider the sequence of footfall patterns in FIG. 9. Pattern 900 indicates that the robot is standing, with all four feet on a surface. Possibly due to a disturbance, such as the robot being pushed to its left, the robot determines a target placement for its left front foot represented by the dotted circle. For instance, the robot may have calculated that placing its left front foot in this location would stabilize its balance. However, this location is beyond the distance that the robot can step. The validity check of any gait controller may fail if this invalid step-out is attempted.

Figure 9:
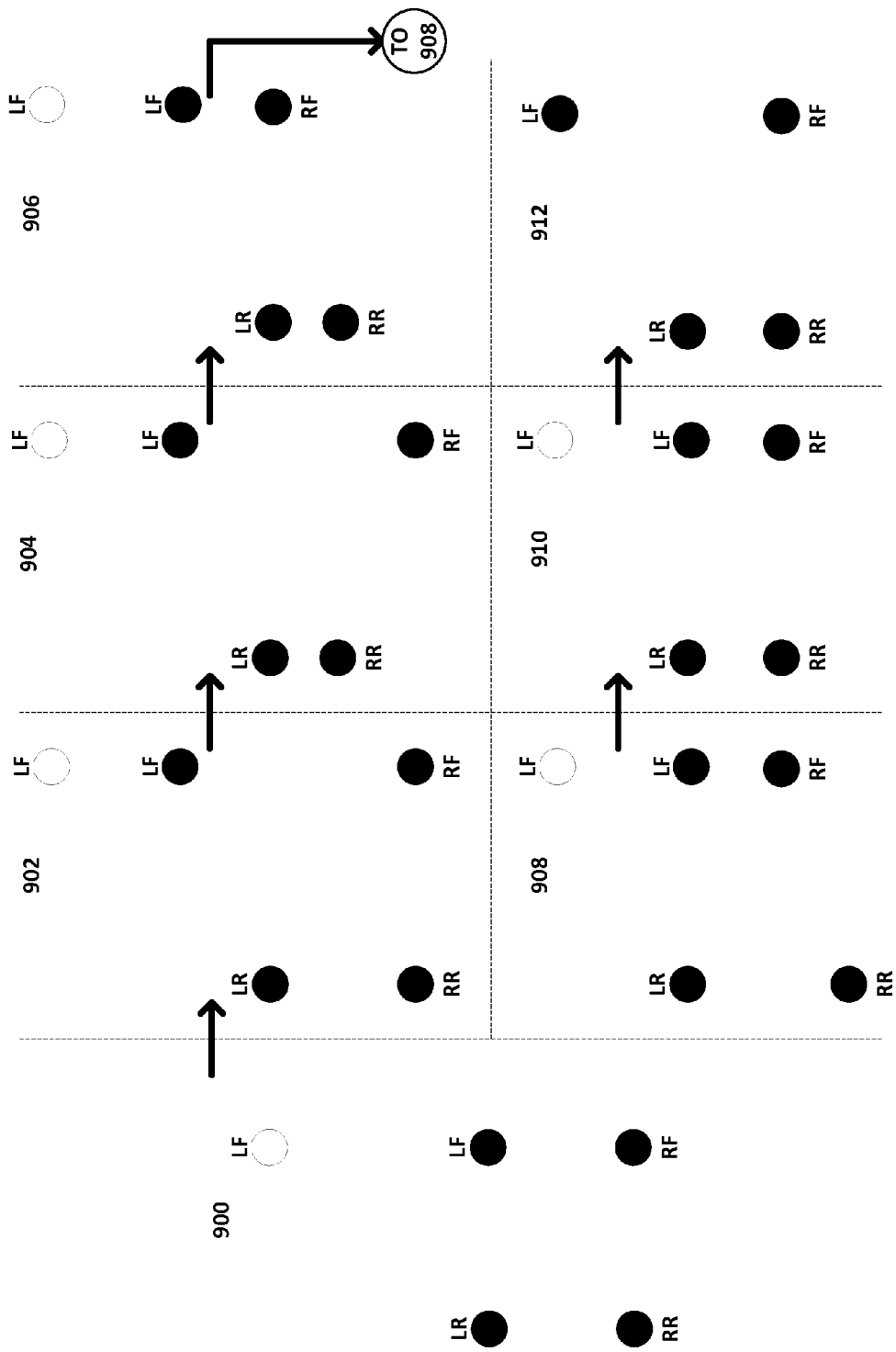
FIG. 9 depicts a sequence of footfall patterns to avoid an invalid step-out action, according to example implementations.

But, as shown in FIG. 9, the robot may instead operate according to one or more recovery gait controllers that stabilize the robot without such a step-out. Particularly, as shown in patterns 902, 904, 906, 908, 910, and 912, the recovery gait controller(s) move the robots feet laterally in smaller steps. First, the robot's left front foot moves toward the target placement, and then it is followed by the right rear foot, right front foot, left rear foot, right rear foot, and the left front foot. In pattern 912, the left front foot is at the target placement, and the robot is stabilized.

FIG. 9 is just one possible implementation of avoid an invalid step-out. Other footfall patterns may be used to accomplish this goal.

6. EXAMPLE OPERATIONS

Figure 10:
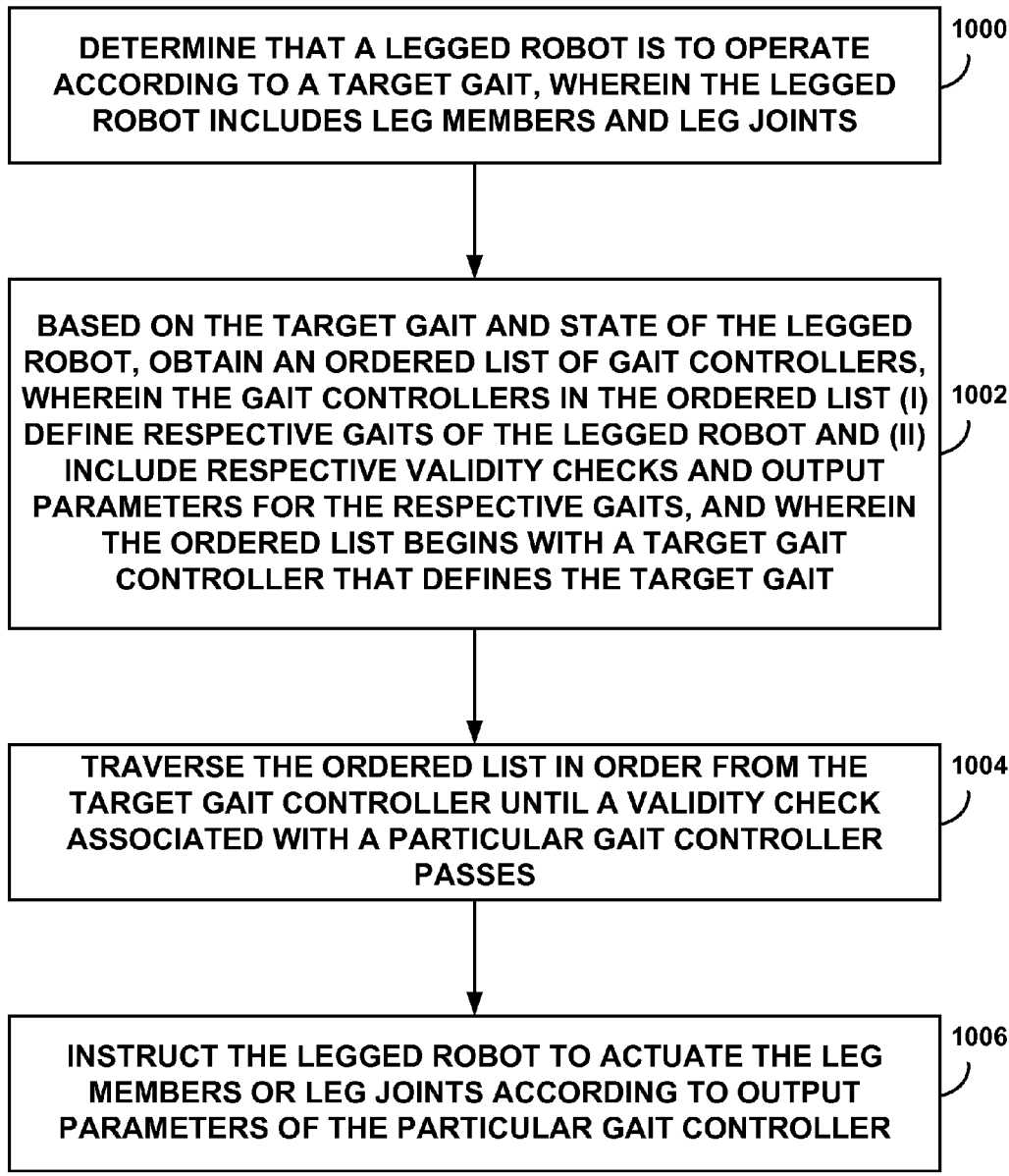
FIG. 10 is another flow chart, according to example implementations.

FIG. 10 is a flow chart illustrating an example implementation. The implementation illustrated by FIG. 10 may be carried out by a computing device, processor(s) 102 and/or controller(s) 108. However, the implementation can be carried out by other types of devices or device subsystems, including a device that is part of or not part of a legged robot being controlled. Further, the implementation may be combined with any other aspect or feature disclosed in this specification or the accompanying drawings.

Block 1000 of FIG. 10 may involve determining that a legged robot is to operate according to a target gait, wherein the legged robot includes leg members and leg joints.

Block 1002 may involve, possibly based on the target gait and state of the legged robot, obtaining an ordered list of gait controllers. The gait controllers in the ordered list may define respective gaits of the legged robot, and include respective validity checks and output parameters for the respective gaits. The ordered list may begin with a target gait controller that defines the target gait. Any given gait controller in the ordered list (that is not the target gait controller) may be operable to change the state of the legged robot such that the changed state at least partially satisfies the validity check of one or more gait controllers that appear in the ordered list before the particular gait controller.

Block 1004 may involve traversing the ordered list in order from the target gait controller until a validity check associated with a particular gait controller passes. The particular gait controller may be the target gait controller or another gait controller in the ordered list. The validity check associated with the particular gait controller may determine whether the particular gait controller is permitted to operate based on the state of the robot and/or a sensed environment of the robot, for instance.

Block 1006 may involve instructing the legged robot to actuate the leg members or leg joints according to output parameters of the particular gait controller.

In some implementations, after instructing the legged robot to actuate the leg members or leg joints according to output parameters of the particular gait controller, the ordered list may be traversed again in order from the target gait controller until a second validity check associated with a second particular gait controller passes. The legged robot may be instructed to actuate the leg members or leg joints according to output parameters of the second particular gait controller.

In some implementations, after instructing the legged robot to actuate the leg members or leg joints according to output parameters of the particular gait controller, it may be determined that the legged robot is to operate according to a second target gait. Possibly based on the second target gait and a second state of the legged robot, a second ordered list of the gait controllers may be obtained. The second ordered list may begin with a second target gait controller that defines the second target gait. The second ordered list may be traversed in order from the second target gait controller until a validity check associated with a second particular gait controller passes. The legged robot may be instructed to actuate the leg members or leg joints according to output parameters of the second particular gait controller.

At least some of the gait controllers may be either (i) cyclic gait controllers that define respective touchdown timings and positions for feet of the legged robot that cause the legged robot to operate according to the respective gaits, (ii) acyclic gait controllers that define touchdown timings and positions for the feet that cause the legged robot to transition from one gait to another, or (iii) recovery gait controllers that define touchdown timings and positions for the feet that cause the legged robot to recover from deviations from a cyclic or acyclic gait. In some implementations, the ordered list of gait controllers may include one or more of each of the cyclic gait controllers, acyclic gait controllers, and recovery gait controllers.

The legged robot may have four legs. The gait controllers may include a walk gait controller with an associated validity check that requires exactly two or exactly three legs of the legged robot to be on a surface. In some implementations, the gait controllers may include a trot gait controller with an associated validity check that requires exactly one diagonal pair of legs, all four legs, or no legs of the legged robot to be on a surface. The associated validity checks may also require that a swing foot will not land beyond a threshold distance from a COM of the robot. The gait controllers may include at least two trot gait controllers with associated validity checks that require exactly one diagonal pair of legs, all four legs, or no legs of the legged robot to be on a surface. Each of the two trot gait controllers may be associated with different trot velocities.

In some implementations, the gait controllers may include a stand gait controller with an associated validity check that requires all legs of the legged robot to be on a surface, and a velocity of the legged robot to be below a threshold value.

In some situations, possibly after block 1002 and before block 1004, a first intermediate gait controller and a second intermediate gait controller may be identified, each of which can be used for the legged robot to achieve the target gait. Possibly based on an instantaneous state of the legged robot, the first intermediate gait controller may be selected as more favorable than the second intermediate gait controller for achieving the target gait. The ordered list may be reordered such that the first intermediate gait controller is before the second intermediate gait controller in the ordered list.

7. INPUT STEERING COMMANDS AND COLLISION AVOIDANCE

As noted above, a robot may receive input commands from an external remote control such as a gamepad or joystick, or may generate the input commands itself. In some cases, these input commands are input steering commands that direct the robot to move in a particular fashion. In the following implementations, these steering commands are incorporated into gait controllers. While doing so increases the number of gait controllers in the ordered lists for respective target gaits, it also allows gait controllers to be evaluated based on how well their associated steering commands match the input steering commands. In some cases, input steering commands may be evaluated based on whether operating the robot according to the input steering commands results in the robot colliding with an obstacle or approaching such an obstacle.

A. Example Obstacle Detection and Collision Avoidance

An aspect that may be considered when selecting a gait controller is the proximity of the robot to various obstacles. A gait that causes the robot to avoid obstacles is generally favorable when compared to one that causes the robot to collide with an obstacle.

In order to incorporate obstacle detection and collision avoidance into gait selection, a robot may incorporate a perception system. As an example, the robot may include one or more LIDAR units, each providing an approximately 360 degree view of the robot's surroundings. A LIDAR unit may transmit light in multiple directions, measuring the light's reflections off of objects in the unit's vicinity. Based on the difference in time between when the light was transmitted and the associated reflection was received, a distance to a given object may be approximated. By performing this operation at a reasonably high frequency, the robot can develop a map of its surroundings.

In some implementations, the robot may use ray tracing to divide the map into "good" and "bad" regions. The "good" regions are areas between the robot and obstacles—spaces to which the robot can move without colliding with an object. The "bad" regions are areas including the detected objects and continuing from the detected objects away from the robot—spaces that might or might not be navigable to the robot. The robot may attempt to remain in "good" regions and to avoid "bad" regions.

Once these regions are detected, the robot may process them into a signed-distance field. This field is a grid that overlays the map of the robot's surroundings. Each element in the grid contains a signed value (e.g., a real number) that represents the distance from that point on the grid to an edge of an obstacle as detected by the LIDAR. In embodiments, positive values are outside of the obstacle, and negative values are inside of the obstacle.

Figure 11A:
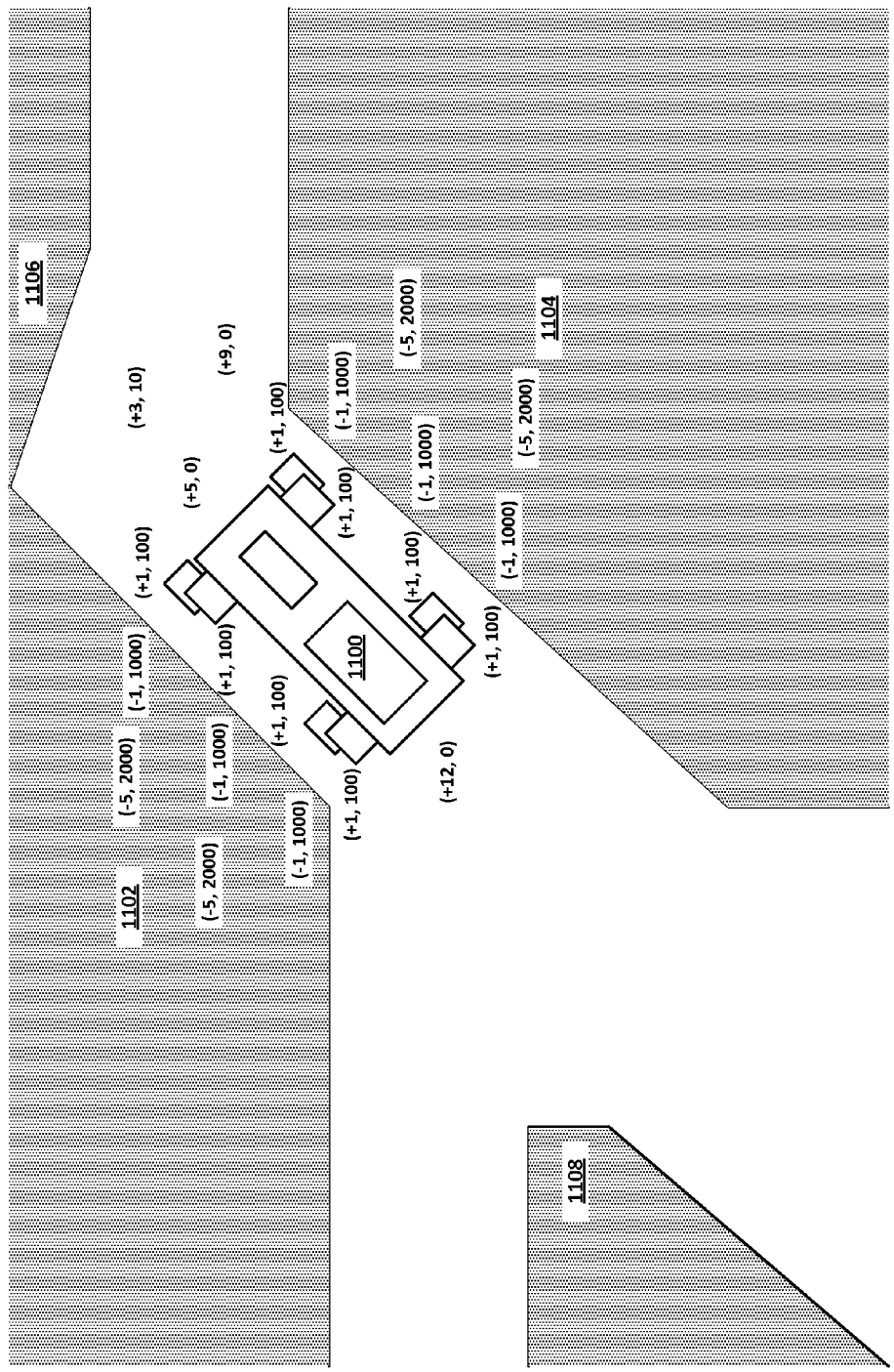
FIG. 11A depicts a robot with perception capabilities navigating a hallway, according to example implementations.

An example signed-distance field is shown in FIG. 11A. Therein, robot 1100 is navigating a set of narrow corridors with walls 1102, 1104, 1106, and 1108. It is assumed that one or more LIDAR units, or other perception sensors, are situated near the center of robot 1100. Thus, the LIDAR unit(s) provide distance measurements to walls 1102, 1104, 1106, and 1108, and robot 1100 (or a remote computing device) converts these measurements into the grid of signed distances shown in FIG. 11A. In FIG. 11A, negative signed-distance values are shaded and positive signed-distance values are unshaded. Also, for purpose of simplicity, FIG. 11A only shows selected points in the grid, whereas the grid has values throughout.

Each signed-distance grid element can be represented as a tuple including a signed distance and an associated cost. The costs can be calculated as a function of their associated signed-distances, and represent the desirability of the robot entering or approaching the associated element in the grid, with higher costs being less desirable. Thus, for instance, the four tuples closest to the left side of robot 1100 indicate positions one unit of distance (e.g., 1 foot) from wall 1102, and associated costs of 100. Similar signed-distance/cost tuples can be found along the right side of robot 1100. At the front of robot 1100, tuples of (+5,0), (+3,10), and (+9,0) are shown. These tuples represents grid elements in the signed-distance field that are sufficiently far from wall 1106 to have a lower cost. Similarly, at the rear of robot 1100, a tuple of (+12,0) represents a grid element sufficiently far from wall 1108 to also have a zero cost.

Additionally, the signed-distance field includes grid elements within or beyond the walls a represented by the ray tracing. For instance, wall 1102 overlaps three grid elements with tuples of (−1,1000). These elements are approximately one unit of distance into the wall from the perspective of the LIDAR unit of robot 1100, and are associated with a cost of 1000. Likewise, wall 1102 overlaps two grid elements with tuples of (−5,2000). Wall 1104 overlaps with similarly-valued grid elements.

The grid elements of FIG. 11A are for purpose of example. In various implementations, a different number of grid elements and/or grid elements with a different density can be used. For example, a grid element may represent a one square foot unit of the robot's environment, or a one square inch unit of the environment. Other possibilities exist.

Robot 1100 may maintain or have access to a table that maps signed-distances to costs. For instance, each signed-distance is associated with a cost that can be manually set or automatically generated based on a mathematical relationship with the signed-distance. In some cases, these mappings may be adjusted by an operator of robot 1100 to change the robot's tolerance to being in the proximity of obstacles. In particular, the distance-to-cost mappings may assign costs that are inversely-proportional to associated distances. In this way, robot 1100 is guided away from obstacles.

Figure 11B:
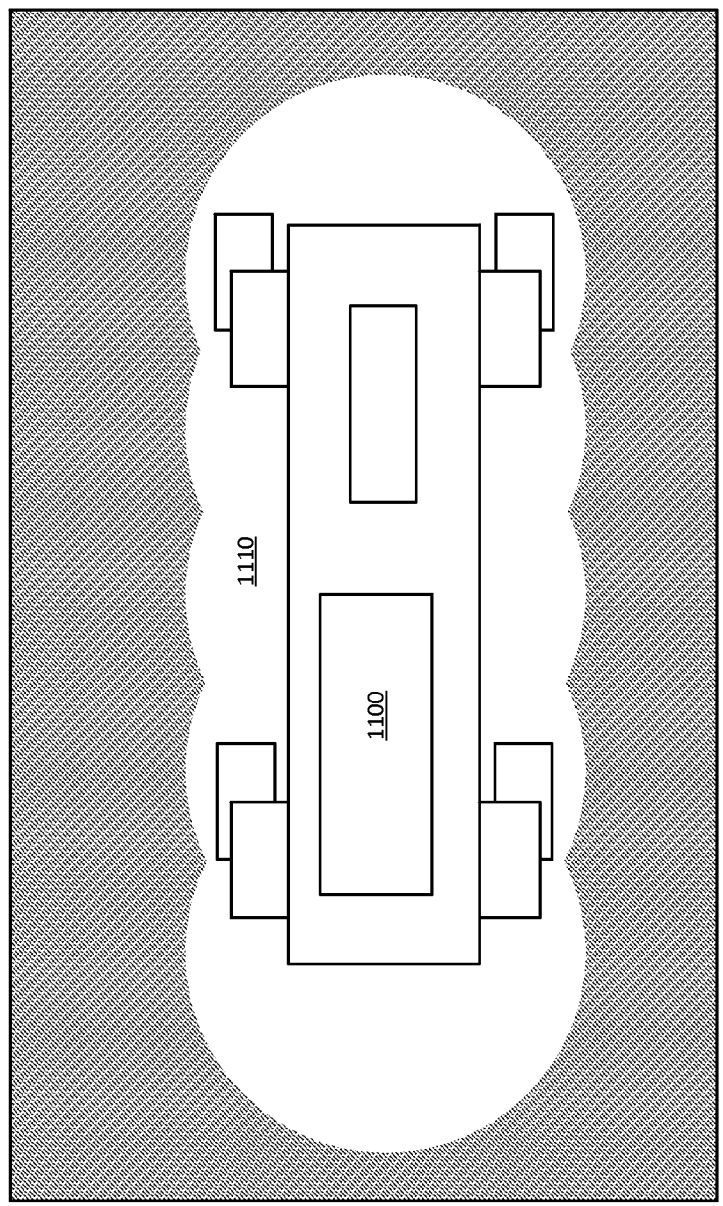
FIG. 11B depicts a model of a robot usable in determining the proximity of the robot to obstacles, according to example implementations.

To that point, robot 1100 may navigate, at least in part, by attempting to find a lowest cost trajectory that conforms to, or is consistent with, its selected gait and input steering commands. To do so, the physical shape of robot 1100 may be approximated as a set of partially-overlapping circles 1110, as shown in FIG. 11B. In this way, robot 1100 can compute its proximity to obstacles by identifying grid elements respectively nearest to the centers of circles 1110, and subtracting the respective circle's radius from the from the signed-distance. The result may approximate the actual distance(s) of the edges of robot 1100 from the obstacles.

Thus, robot 1100, when in the position shown in FIG. 11A, may associate a cost of 100 to each of its sides, as its edges are approximately one unit of distance from walls 1102 and 1104, respectively. Some of these costs may increase if robot 1100 moves further to its left or right. Likewise, robot 1100 may associate a cost of 0 with its front and rear sections, as they are sufficiently far from any obstacle to have no appreciable cost. Thus, robot 1100 may move forward or backward without increasing its obstacle cost (and therefore without any immediate concern of colliding with an obstacle).

Nonetheless, robot 1100 may approach obstacles, even those with a relatively high cost, if doing so is a way (maybe the only way) to achieve a goal. Further, by assigning very large costs to obstacles and the spaces beyond such obstacles, robot 1100 is unlikely to collide with such an obstacle. But, if robot 1100 determines that it must unavoidably collide with an obstacle (e.g., if the obstacle is moving or the trajectory of the robot has been disturbed by external forces), it may attempt to do so at an angle or speed such that it glances off the obstacle rather than impacts the obstacle more forcefully.

As an example, if robot 1100 is instructed to walk straight toward a wall, it may do so, but begin to slow down as it approaches the wall. Robot 1100 may also seek out other paths that it can take to achieve the goal of walking forward. For instance, if there is a doorway in the wall several feet to the left of robot 1100, robot 1100 may adjust its trajectory and approach the doorway so that it can continue moving forward through the doorway.

In some cases, robot 1100 may use collision avoidance techniques to override, to some extent, its input steering commands. The next subsection describes such commands and how they may be modified in order to avoid collisions.

B. Example External Remote Control and Input Modification

Figure 12:
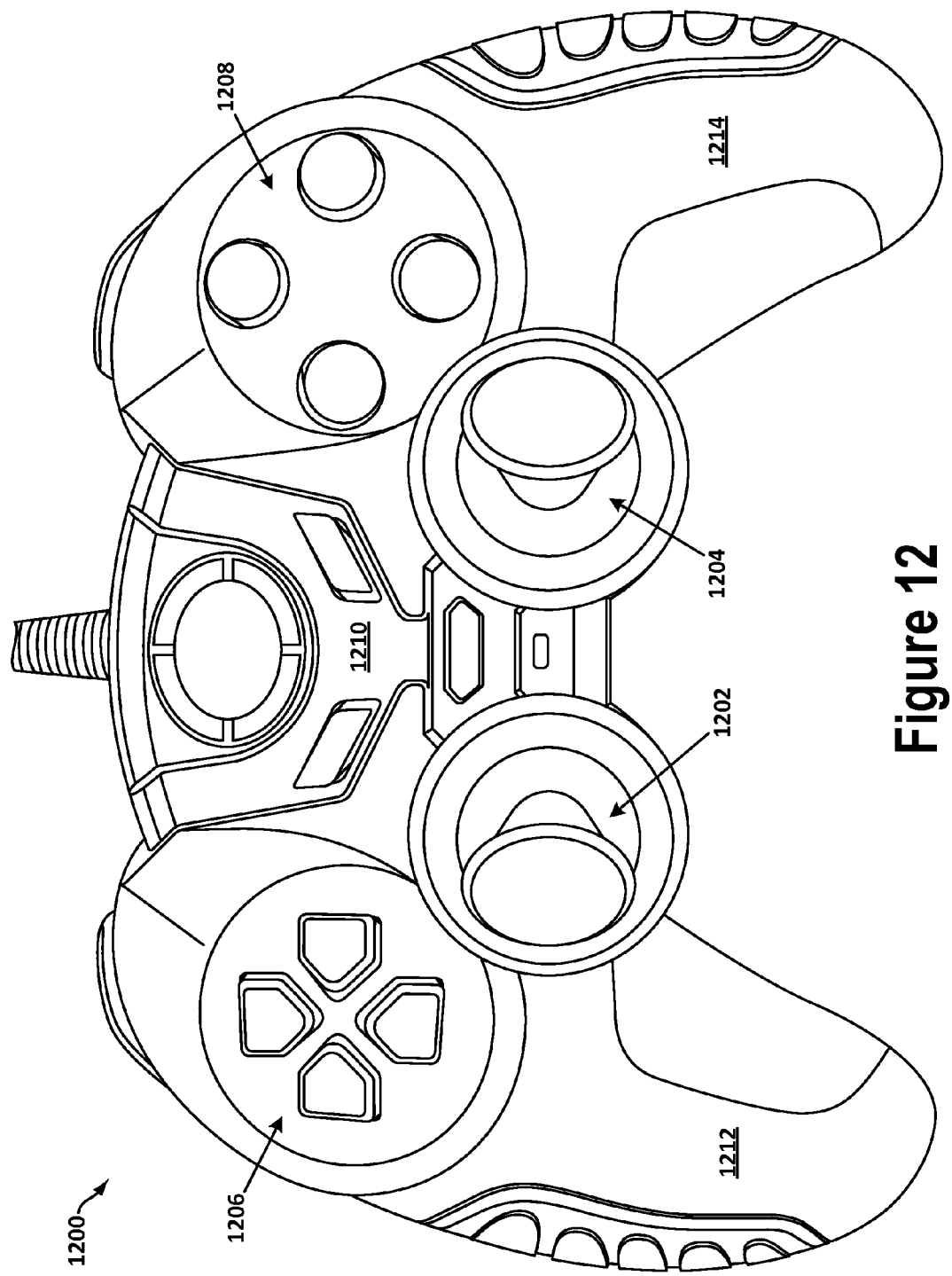
FIG. 12 depicts an external remote control, according to example implementations.

FIG. 12 depicts a gamepad-style external remote control 1200. External remote control 1200 includes left joystick 1202, right joystick 1204, left-hand buttons 1206, right-hand buttons 1208, central buttons 1210, as well as grips 1212 and 1214. In some implementations, external remote control 1200 may include more or fewer joysticks, buttons, grips, and/or other components or features.

Joysticks 1202 and 1204 may protrude vertically (out of the page with respect to FIG. 12) from external remote control 1200, and may be configured to be tilted in 360 degrees. When not tilted, joysticks 1202 and 1204 may be considered to be in a neutral position.

Left joystick 1202 may control the yaw rate of a robot, and right joystick 1204 may control the velocity of the robot. The yaw rate may be the angular velocity of the robot around a yaw axis that extends upward from the surface on which the robot is situated. Thus, the yaw rate relates to turning in the same way that velocity relates to speed, and yaw rate relates to heading in the same way that velocity relates to position. When in their respective neutral positions, a yaw rate of 0 degrees and a velocity of 0 units may be transmitted to the robot.

When left joystick 1202 is tilted in the forward direction (toward the top of the page in FIG. 12), a yaw rate of 0 degrees per second may be transmitted to the robot. However, when left joystick 1202 is tilted in a non-forward direction, a yaw rate of some non-zero measure of degrees per second may be transmitted to the robot. For instance, if left joystick 1202 is tilted to the left, a yaw rate of 30 degrees per second may be transmitted. Analogously, if left joystick 1202 is tilted to the right, a yaw rate of −30 degrees per second may be transmitted to the robot. If left joystick 1202 is tilted backward, a yaw rate of 0 degrees per second may be transmitted, effectively making this joystick position "neutral." Nonetheless, this is just one possible example of how left joystick 1202 can be configured to transmit a yaw rate. Other configurations with different yaw rates associated with various joystick positions may be used instead.

In general, the yaw rate transmitted to the robot causes the robot to adjust its heading accordingly. While a yaw rate of 0 degrees per second indicates that the robot should maintain its current heading, a non-zero yaw rate indicates that the robots heading should change with a speed in proportion to the absolute value of the yaw rate. Thus, for example, a yaw rate of 30 degrees per second may cause the robot to turn left at twice the speed as that of a yaw rate of 15 degrees per second.

When right joystick 1204 is tilted in the forward direction, a forward velocity may be transmitted to the robot, perhaps causing the robot to walk, trot, run, etc. in its current heading. When right joystick 1204 is tilted in the left direction, a leftward velocity may be transmitted to the robot, perhaps causing the robot to side-step to the left without changing its heading. Similarly, when right joystick 1204 is tilted in the right direction, a rightward velocity may be transmitted to the robot, perhaps causing the robot to side-step to the right without changing its heading. When right joystick 1204 is tilted backward, a reverse (negative) velocity may be transmitted to the robot, perhaps causing the robot to walk, trot, run, etc. backward without changing its heading. These velocities may increase in proportion to the amount of tilt. For instance, the greater the forward tilt, the higher the forward velocity transmitted to the robot. In this manner, right joystick 1204 may control the x-direction and y-direction velocities of the robot.

The inputs of left joystick 1202 and right joystick 1204 may be combined in various ways. For instance, if left joystick 1202 is tilted in the 15 degree per second position while right joystick 1204 is tilted forward, the robot may be instructed to adjust its heading to the left and walk forward according to this heading. In other words, the robot may walk in a forward, leftward arc. Or, if left joystick 1202 is tilted in the −30 degree position while right joystick 1204 is tilted backward, the robot may walk in a sharp backward, rightward arc. If left joystick 1202 is tilted in a non-zero position while the right joystick 1204 remains in the neutral position, the robot may rotate in place. Other possibilities exist.

External remote control 1200 is just one possible example, and other types of external remote controls may be used instead. Further, the individual joystick(s), button(s), and other mechanisms on external remote control 1200 or any other external remote control may operate differently than described herein. For instance, the yaw functions of left joystick 1202 could be controlled with buttons or switches, and the velocity functions of right joystick 1204 could also be controlled with buttons or switches. Alternatively, an external controller with only one joystick may be used, and the position of this joystick may represent both velocity and yaw rate.

Regardless, the input steering commands from an external remote control or some other source, may include planar (x,y) velocity components and a yaw rate. These commands may be used to instruct a robotic device (legged or wheeled) to move in accordance with the specified velocities and yaw rate. However, in some cases, it may be desirable for the robotic device to not adhere strictly to the commanded input. For instance, as discussed above, the robotic device might detect an obstacle in its path, and may choose to deviate from the commanded velocities and/or yaw rate so that it can avoid contact with the obstacle. In particular, the robotic device may determine that if it follows the commanded trajectory, it will collide with or come too close to the obstacle within a particular period of time (e.g., within the next 1-5 seconds). Thus, it is beneficial if the robotic device can derive, from the input steering commands, a modified version thereof that can be used to adjust the robotic device's trajectory.

The three components of the input steering commands, $x_{in}$, $y_{in}$, and $\omega_{in}$ (representing the x velocity, y velocity and yaw rate respectively) can each be modified with a scaling factor and an offset as follows:

$$x_{out} = a_x x_{in} + b_x$$

$$y_{out} = a_y y_{in} + b_y$$

$$\omega_{out} = a_\omega \omega_{in} + b_\omega$$

The scaling factors, $a_x$, $a_y$, and $a_\omega$, are gains for the respective input values, while the constants, $b_x$, $b_y$, and $b_\omega$, are respective offsets to these values. For instance, if $a_x=1$ and $b_x=0$, then the x-direction velocity is used as is. But if $a_x=0$, the x-direction velocity is effectively replaced by the constant $b_x$.

Various combinations of scaling factors and constants may be used. For instance, suppose that $\omega_{in}$ is 5 degrees per second, and the robotic device is commanded to move forward in a particular direction (resulting in an arc-like trajectory). If the robotic device determines that it will collide with an object by continuing to follow this trajectory, the robotic device may set $a_\omega=2.0$ and $b_\omega=10$ so that the robotic device smoothly veers around the obstacle according to a trajectory with an arc that has a smaller radius (i.e., with a yaw rate of 20 degrees per second). Other implementations are possible.

The choice of scaling factors and constants may be based on a combination of the input steering commands, state of the robotic device, and/or sensor input. As one example, the robotic device may gradually reduce the scaling factor is its x-direction velocity as it approaches a wall in the x direction. If it senses a nearby gap in the wall through which it can fit, the robotic device may readjust the scaling factors and constants so that it will move through the gap. One way of accomplishing the selection of scaling factors and constants can be through use of a cost function that assigns (i) collision costs that scale with the distances between the robotic device and other objects, and (ii) input deviation costs that scale with the difference between the input steering commands and the modified input steering commands.

In some cases, the input steering commands may represent the instantaneous movement of the robotic device, and the modified input steering commands may be an adjustment to this movement (e.g., if the robotic device is traveling with particular y-direction velocity, it can be slowed down by 10% if $a_y=0.9$ and $b_y=0$). In these cases, the input steering commands might not be received from an external remote control, but generated by the robotic device or some other entity.

Figure 13:
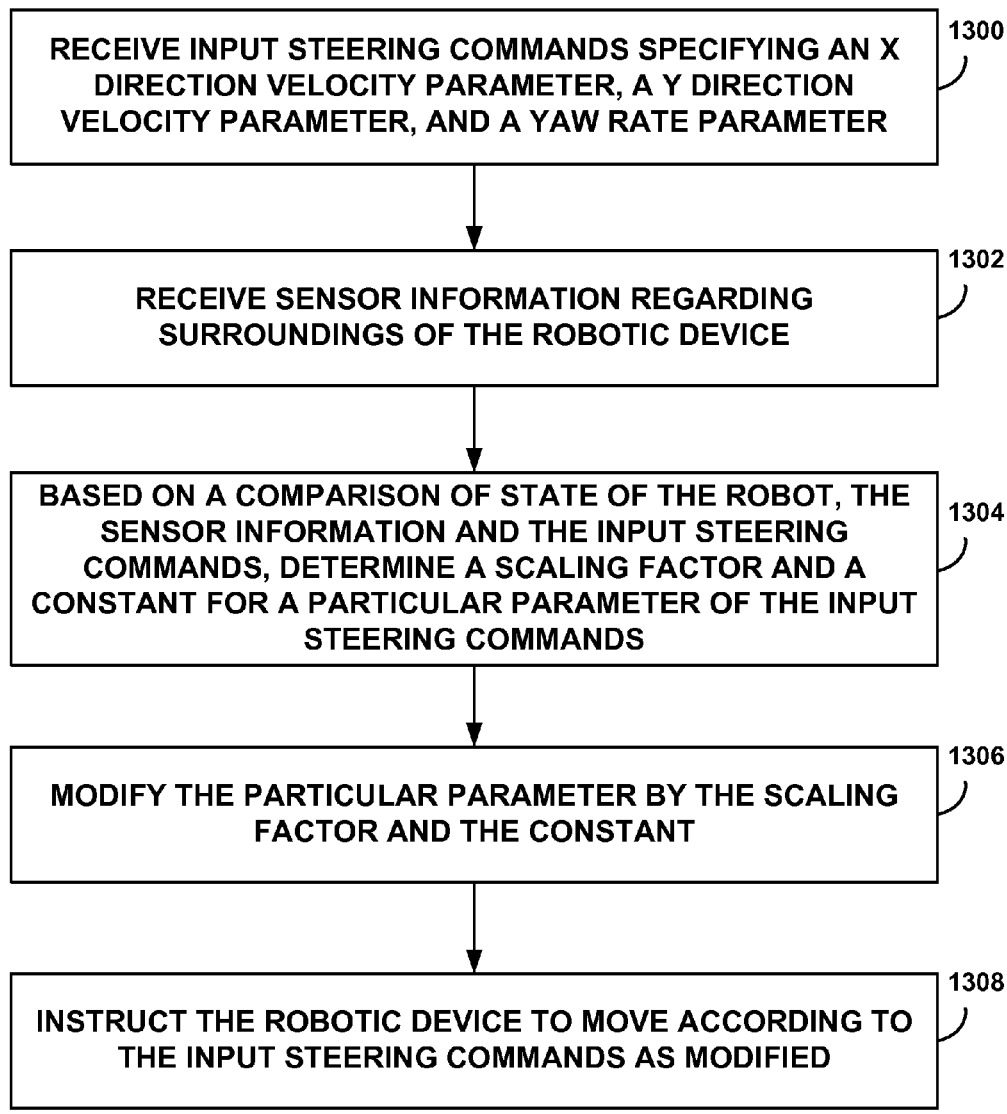
FIG. 13 is a flow chart, according to example implementations.

FIG. 13 is a flow chart illustrating an example implementation related to such modification of input steering commands. The implementation illustrated by FIG. 13 may be carried out by a computing device, processor(s) 102 and/or controller(s) 108. However, the implementation can be carried out by other types of devices or device subsystems, including a device that is part of or not part of the robotic device being controlled. Further, the implementations may be combined with any other aspect or feature disclosed in this specification or the accompanying drawings. Moreover, the implementations may operate with robotic devices that are legged, wheeled, or use another form of locomotion.

Block 1300 of FIG. 13 may involve receiving input steering commands specifying an x direction velocity parameter, a y direction velocity parameter, and a yaw rate parameter. The input steering commands may be received from an external remote control or generated by a robotic device in order to follow a path, among possible examples.

Block 1302 may involve receiving sensor information regarding surroundings of the robotic device. Block 1304 may involve, possibly based on a comparison of state of the robot, the sensor information and the input steering commands, determining a scaling factor and a constant for a particular parameter of the input steering commands. The particular parameter may be one of the x direction velocity parameter, the y direction velocity parameter, or the yaw rate parameter. Each of the scaling factor and the constant may be non-zero or zero. Selection of the scaling factor and the constant may be part of gait controller selection, as described below.

For instance, the sensor information may indicate that the robotic device is approaching an obstacle. The scaling factor may be determined to be less than 1 based on the robotic device approaching the obstacle, thus slowing the robotic device. Or, the robotic device can be forced to halt if both the scaling factor and the constant are zero.

Also possibly based on the comparison of state of the robot, the sensor information, and the input steering commands, a second scaling factor and a second constant may be determined for a second particular parameter of the input steering commands. The second particular parameter may be modified by the second scaling factor and the second constant. Also possibly based on the comparison of state of the robot, the sensor information and the input steering commands, a third scaling factor and a third constant may be determined for a third particular parameter of the input steering commands. The third particular parameter may be modified by the third scaling factor and the third constant.

Block 1306 may involve modifying the particular parameter by the scaling factor and the constant. This modification may involve multiplying the particular parameter by the scaling factor to produce a product, then adding the constant to the product. Block 1308 may involve instructing the robotic device to move according to the input steering commands as modified.

Nonetheless, in some cases, the input steering commands may be applied as is. For instance, when the scaling factor is 1 and the constant is 0, values of the input steering commands are preserved.

The determination of scaling factors and constants as described herein is a technique for generating candidate steering commands for selection. The advantage of this technique over using a pre-selected set of candidate steering commands is that it gives dense coverage in the space of possibilities similar to the input steering command and sparse coverage elsewhere. Dense coverage gives smoother motion while sparse coverage reduces computational costs. The scaling factor and constant arrangement gives a large number of candidate steering commands to choose from that are similar to the input steering command, but still provides a few candidates that are different just in case the entire region of steering space surrounding the input steering command results in undesirable behavior (e.g., coming into contact with a wall or another type of obstacle). This results in a robot exhibiting smooth motion if the input steering command and the selected steering command are close, but maintains the ability for the selected steering command to deviate drastically from the input steering command if necessary.

8. GAIT SELECTION BASED ON INPUT STEERING COMMANDS AND COLLISION AVOIDANCE

Regardless of how input steering commands are provided and whether these commands are modified, a robot may use the commands, and perhaps collision avoidance mechanisms as well, to select a gait. Notably, steering commands may be incorporated into gait controllers, and a list of gait controllers for a particular target gait may be reordered based on these commands. The reordering may also be based on the robot's proximity to one or more obstacles should the robot operate according to the respective gaits.

Thus, each type of gait supported by a robot may be associated with a variety of different footstep patterns, COM velocity ranges, and yaw rates. As one example, six types of walk may be defined—a slow walk forward with 0 degrees per second yaw rate (straight ahead movement), a slow walk forward with 10 degrees per second yaw rate (turning slightly to the left), and a slow walk forward with −10 degrees per second yaw rate (turning slightly to the right), as well as a fast walk forward with 0 degrees per second yaw rate, a fast walk forward with 10 degrees per second yaw rate, and a fast walk forward with −10 degrees per second yaw rate. Each of these types of walk may be considered to be a different gait. Other walking gaits are possible, such as backward walks and sidesteps to the left and/or right. Each of these gaits may involve different velocities and yaw rates.

Software modules that define these gaits may be organized into discrete gait controllers. Each gait controller may map from the robot's instantaneous state to output parameters that achieve the associated gait. Each gait controller may also be associated with zero or more validity constraints. The state of the robot may include the robot's velocity, yaw rate, and position, as well as joint angles and joint torques for the legs of the robot, for instance. The output parameters may include prospective footstep locations, as well as desired joint torques and joint angles of the robot's legs so that the robot can achieve the prospective footstep locations over a particular time horizon (e.g., the next 1-5 seconds).

To define gaits, each gait controller may be associated with a set of three scaling factors and three constants described in Section 7B above. Thus, selection of a gait controller implicitly selects values for the scaling factors and constants.

Figure 14:
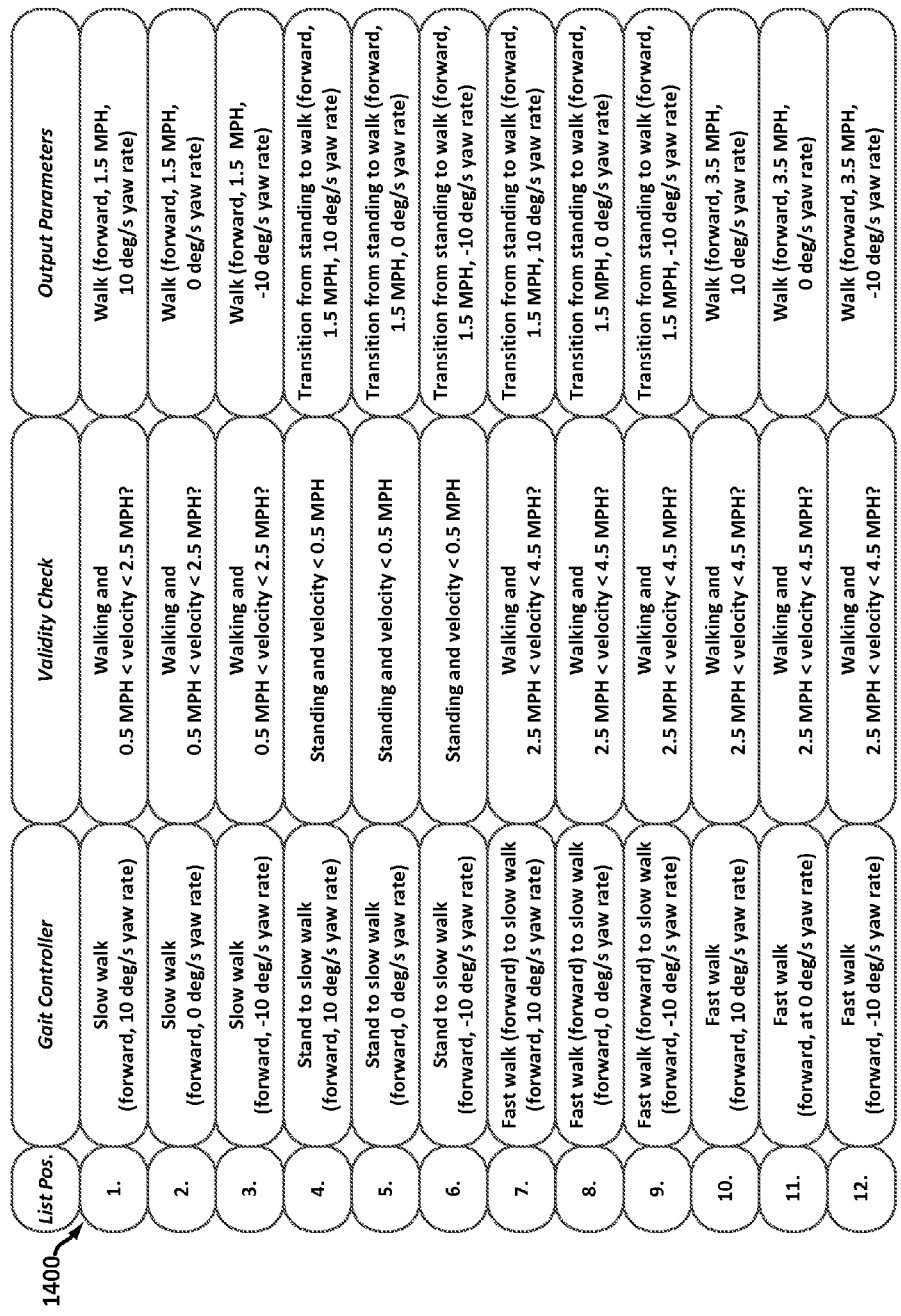
FIG. 14 depicts a further list of gait controllers, according to example implementations.

As an illustrative example, FIG. 14 depicts various cyclic and acyclic gait controllers in list 1400. The target gait is represented by the "slow walk at 10 degrees per second yaw rate" gait controller. This gait controller has a validity check requiring that the robot be walking (e.g., having 2 or 3 feet in on the surface) at a velocity in the range of 0.5 MPH and 2.5 MPH. If this validity check passes, then the robot is instructed to walk at 1.5 MPH with a yaw rate of 10 degrees per second. Similarly appropriate validity checks and output parameters are defined for other gait controllers in list 1400.

In some cases, each of the validity checks in a list of gait controllers may be different from one another. This would avoid a situation where the highest-priority gait controller with a particular validity check prevents lower-priority gait controllers with the same validity check from being selected. Thus, there may be additional factors in the validity checks of the gait controllers in list positions 2, 3, 5, 6, 8, 9, 10, 11, and 12, for example. FIG. 14, however, omits these factors for purpose of simplicity.

Such a list can be processed according to FIG. 8. The first gait controller in the list is considered. If all of the validity tests associated with the first gait controller pass, the first gait controller is selected. If not, the next gait controller in the list is considered and so on until a gait controller is found that passes all validity tests. Once a gait controller has been selected, the robot is operated according to this gait controller for a period of time. Then, a list is selected once again (which may be the same list or a different list), and the process repeats.

In some cases, the list may be reordered so that a "more desirable" gait controllers are placed above "less desirable" gait controllers. The desirability of each gait controller may be determined by applying a cost function to the gait controllers in the list. The cost function may assign a cost to a given gait controller based on (i) a difference between the steering commands of the given gait controller and the input steering commands, and (ii) a proximity of the robot to one or more obstacles should the robot operate according to a given gait of the given gait controller for a pre-defined period of time. The cost function may also include other factors.

The difference between the steering commands of the given gait controller and the input steering commands may be based on a difference between the respective velocity of the given gait controller and the input velocity, and a difference between the respective yaw rate of the given gait controller and the input yaw rate. In this way, the cost function rewards gait controllers that cause the robot to move in accordance with the steering commands, and penalizes gait controllers that do not.

With respect to the proximity of the legged robot to obstacles, the robot may utilize the techniques described in the context of FIGS. 11A and 11B. Thus, the cost provided by the cost function may increase in proportion to the proximity of the robot to the one or more obstacles. Therefore, the cost function rewards gait controllers that would result in obstacles being avoided, and penalizes gait controllers that would result in obstacles being approached or struck. Particularly, a gait controller that would hit an obstacle might have an extremely large (or effectively infinite) cost.

Figure 15A:
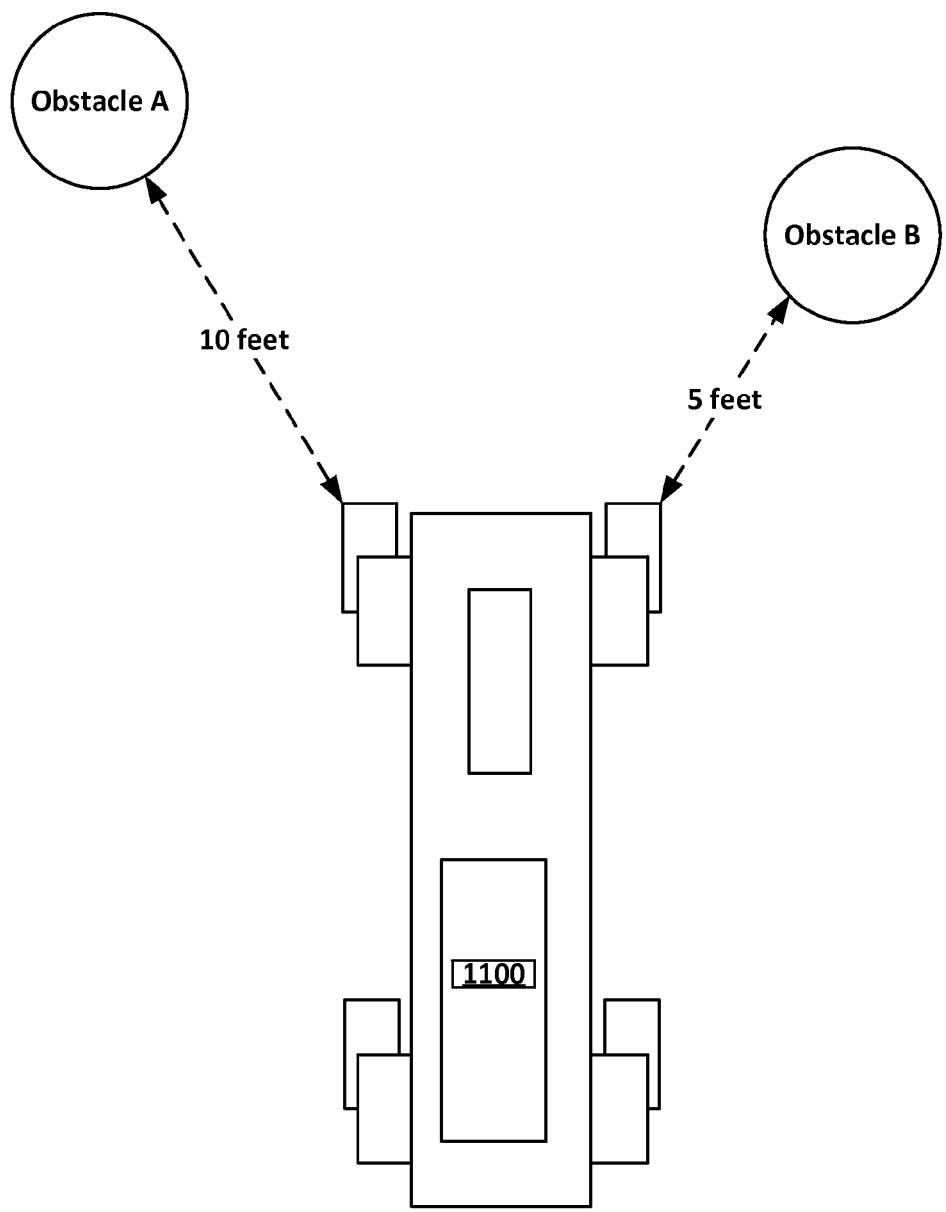
FIG. 15A depicts a robot in the vicinity of obstacles, according to example implementations.

An example of robot 1100 in the vicinity of obstacles is shown in FIG. 15A. Robot 1100, the front of which is toward the top of the page and the rear of which is toward the bottom of the page, may be near two obstacles, Obstacle A and Obstacle B. Each of these could be any type of obstacle, such as a rock, tree, column, etc. Robot 1100 may be instructed by input steering commands to walk forward at 2.0 MPH with a 10 degree per second yaw rate. This would result in the robot 1100 turning slightly to the left while moving forward, a trajectory shown in FIG. 15B. Consequently, following the steering commands could lead to the robot striking Obstacle A.

When a robot does not follow its input steering commands exactly, additional costs may be calculated for the robot's deviations in resultant yaw and position. FIG. 15C illustrates how resultant yaw and position deviations can be calculated. In FIG. 15C, an initial position of robot 1100 is shown in dashed lines. In this case, the heading of robot 1100 is toward the top of the page, and the center line of robot 1100 (an imaginary line that bisects robot 1100 lengthwise) is shown. Robot 1100 is also shown in solid lines after moving forward and turning 10 degrees to the left. The center line of robot 1100 after moving forward and turning is also shown. The resultant yaw deviation is the angle between the center lines of robot 1100 before and after moving forward and turning. The resultant position deviation is difference between the lateral locations of the center of robot 1100, as indicated by the respective positions of the center lines before and after moving forward and turning. Each of these deviations may also be assigned costs.

Figure 15B:
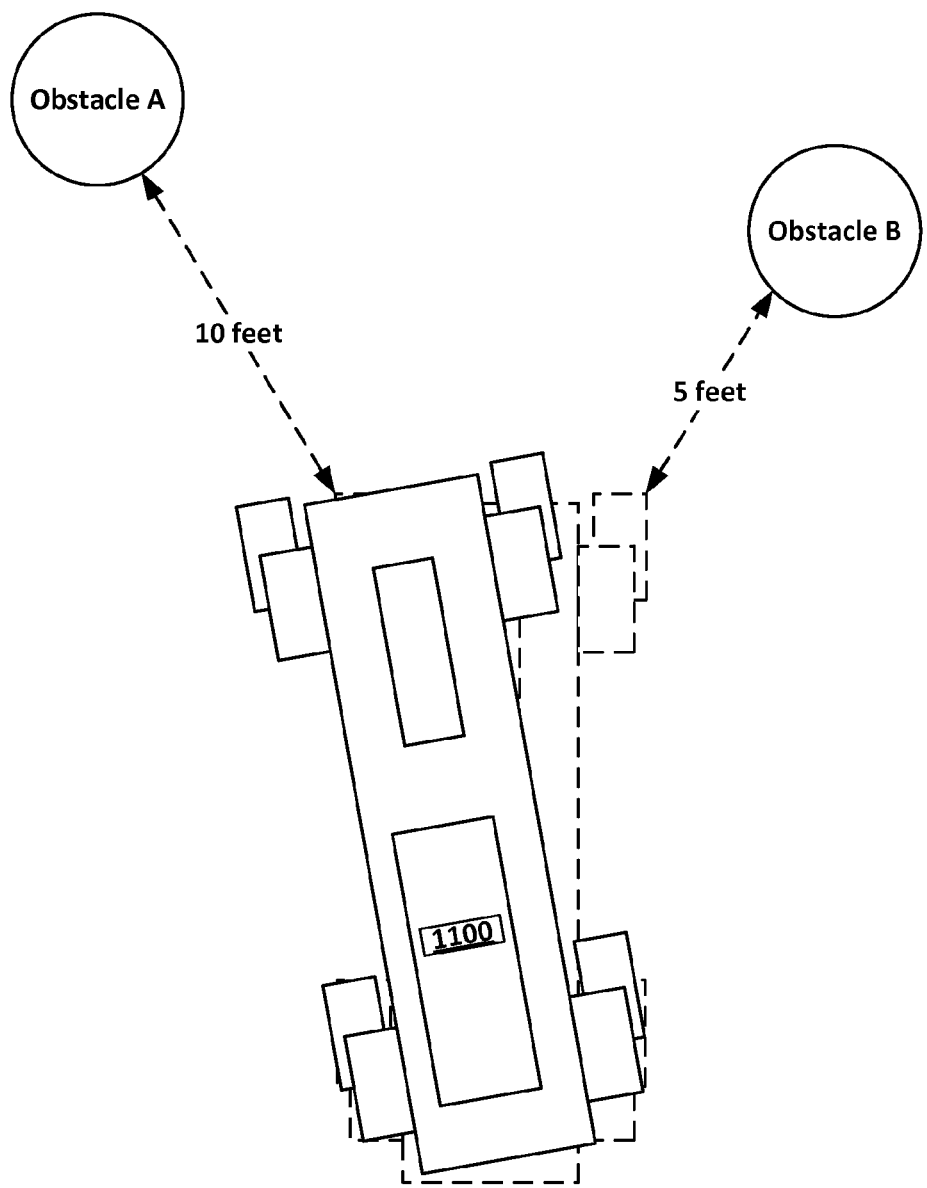
FIG. 15B depicts the robot in the vicinity of the obstacles, turned 10 degrees left, according to example implementations.
Figure 15C:
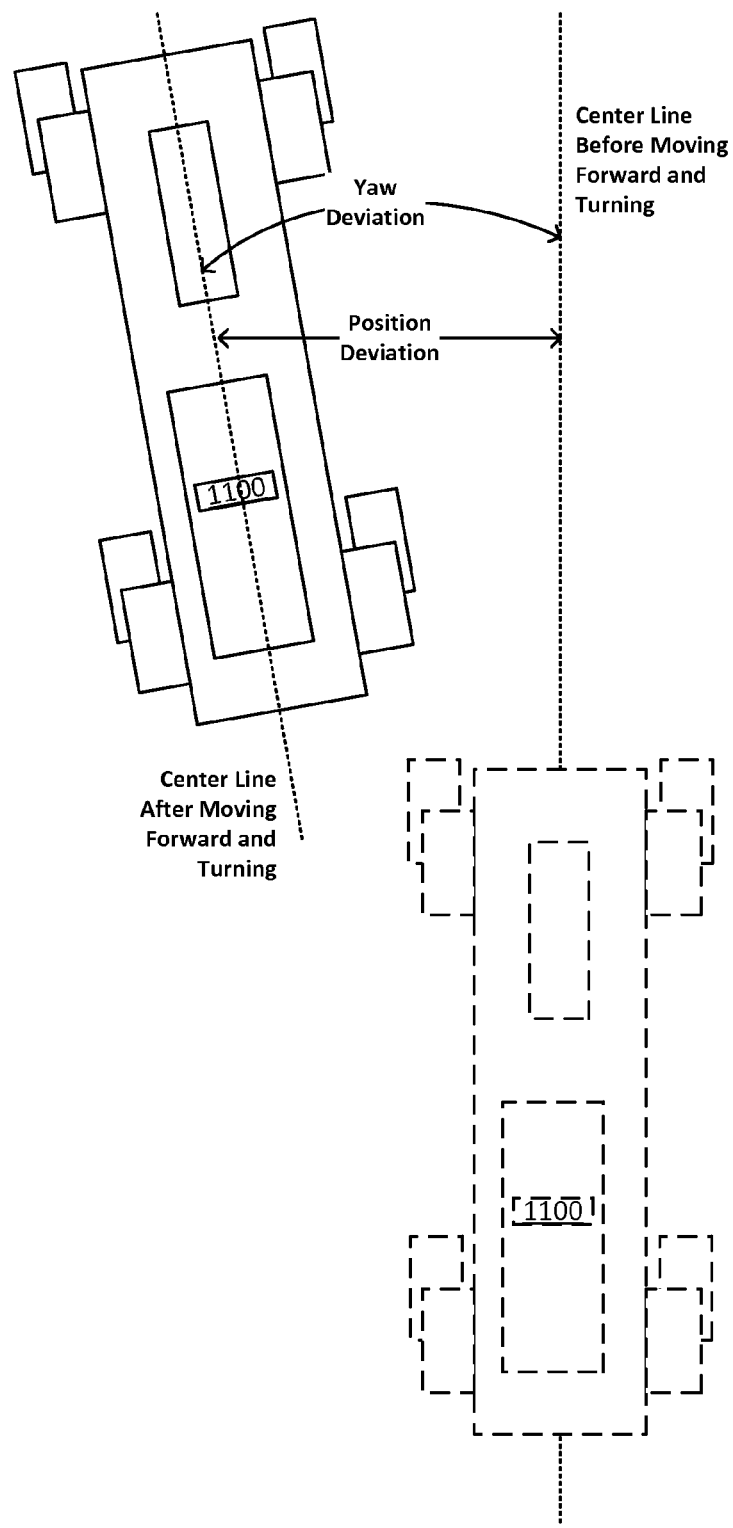
FIG. 15C depicts a technique for determining deviation from a planned trajectory, according to example implementations.

An example of the costs associated with the gait controllers in FIG. 14, given the obstacles of FIGS. 15A and 15B and input steering commands, is shown in list 1600 of FIG. 16. In list 1600, a yaw error, a velocity error, and an obstacle proximity error is shown for each gait controller. The yaw error is calculated as a difference in degrees per second between the input yaw rate of the steering command and the yaw rate of the gait controller. The velocity error is calculated as a cost of 1 per every 0.1 MPH difference between the input velocity of the steering command, and the velocity of the gait controller. A resultant yaw deviation and a resultant position deviation are omitted from FIG. 16 for purpose of simplicity, but these factors may be considered part of the overall cost in various implementations.

The obstacle proximity error grows with the how close the legged robot will be to various obstacles. In this example, a 10 degree per second yaw rate results in the legged robot heading toward Obstacle A, and a cost of 100 is assigned. A −10 degree per second yaw rate results in the legged robot heading toward Obstacle B. Since Obstacle B is closer to the legged robot than Obstacle A, a cost of 200 is assigned. These cost values are used for purpose of example. Other cost values may be used instead.

The total error is the sum of the yaw error, velocity error, and obstacle proximity error. In some implementations, the total error may be based on a weighted sum of these values, so that certain types of error can be given more significance than others. Moreover, each of the error terms (yaw error, velocity error, and obstacle proximity error) can be determined in other ways. For instance, each could be a squared error.

As an example, the robot may be instructed by input steering commands to walk forward at 2.0 MPH with a 10 degree per second yaw rate, as noted above. The gait controller in list position 1 of FIG. 16 facilitates the robot moving forward in a slow walk (1.5 MPH) with a 10 degree per second yaw rate. Thus, the yaw error is 0, the velocity error is 5 (to represent the difference between the 2.0 MPH commanded velocity and the 1.5 MPH velocity that this gait controller supports), and the obstacle proximity error is 100 (due to proximity to obstacle A should the robot operate according to this gait controller). As a result, the total error for this gait controller is 105. On the other hand, the gait controller in list position 2 facilitates the robot moving forward in a slow walk with a 0 degree per second yaw rate. Thus, the yaw error is 10 and the velocity error is 5, but the obstacle proximity error is 100 (due to the robot being able to avoid both obstacles A and B should the robot operate according to this gait controller). As a result, the total error for this gait controller is 15. This indicates that the gait controller in list position 2 is more desirable than the gait controller in list position 1.

FIG. 17 depicts an ordered list 1700 of gait controllers after reordering according to the costs of FIG. 16. Notably, gait controllers with 0 degree per second yaw rate are at the top of the list. This trajectory will lead the robot between the two obstacles, avoiding both. In this way, the robot selects a gait controller that steers the legged robot in a similar fashion to the steering commands, but avoids striking obstacles.

Note that in practice, it is rare for more than one gait controller to have the same total error. However, in the case of a tie between the total errors of two or more gait controllers at the top of the list, the first gait controller in the list may be selected, or any of the tied gait controllers may be selected. Alternatively, if one of the tied gait controllers is the gait controller that was previously running, that gait controller may be selected.

Figure 18A:
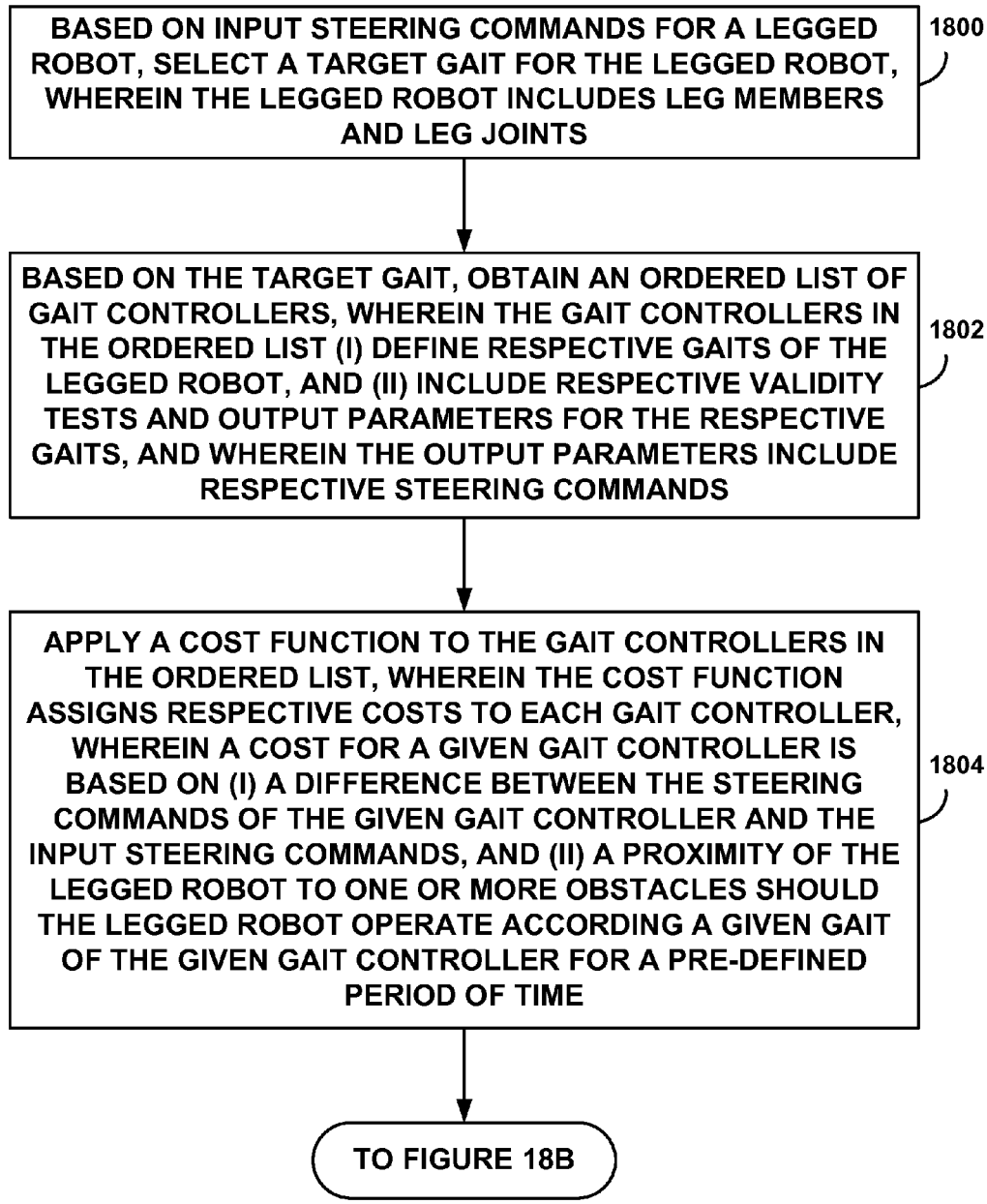
FIGS. 18A and 18B depict yet another flow chart, according to example implementations.

FIG. 18A is a flow chart illustrating an example implementation. The implementation illustrated by FIGS. 18A and 18B may be carried out by a computing device, processor(s) 102 and/or controller(s) 108. However, the implementation can be carried out by other types of devices or device subsystems, including a device that is part of or not part of a legged robot being controlled. Further, the implementation may be combined with any other aspect or feature disclosed in this specification or the accompanying drawings.

Block 1800 of FIG. 18A may involve, possibly based on input steering commands for a legged robot, selecting a target gait for the legged robot. The legged robot may include leg members and leg joints. The steering commands may be received from a remote controller. Alternatively, the steering commands may be based on a path that the legged robot has been instructed to follow.

Block 1802 may involve, possibly based on the target gait, obtaining an ordered list of gait controllers. The gait controllers in the ordered list may (i) define respective gaits of the legged robot, and (ii) include respective validity tests and output parameters for the respective gaits. The output parameters may include respective steering commands.

Block 1804 may include applying a cost function to the gait controllers in the ordered list. The cost function may assign respective costs to each gait controller, where a cost for a given gait controller may be based on (i) a difference between the steering commands of the given gait controller and the input steering commands, and (ii) a proximity of the legged robot to one or more obstacles should the legged robot operate according a given gait of the given gait controller for a pre-defined period of time. The pre-defined period of time may be 2 seconds or less. In some implementations, the pre-defined period of time may be 1 second or less, 5 seconds or less, 10 seconds or less, and so on.

Figure 18B:
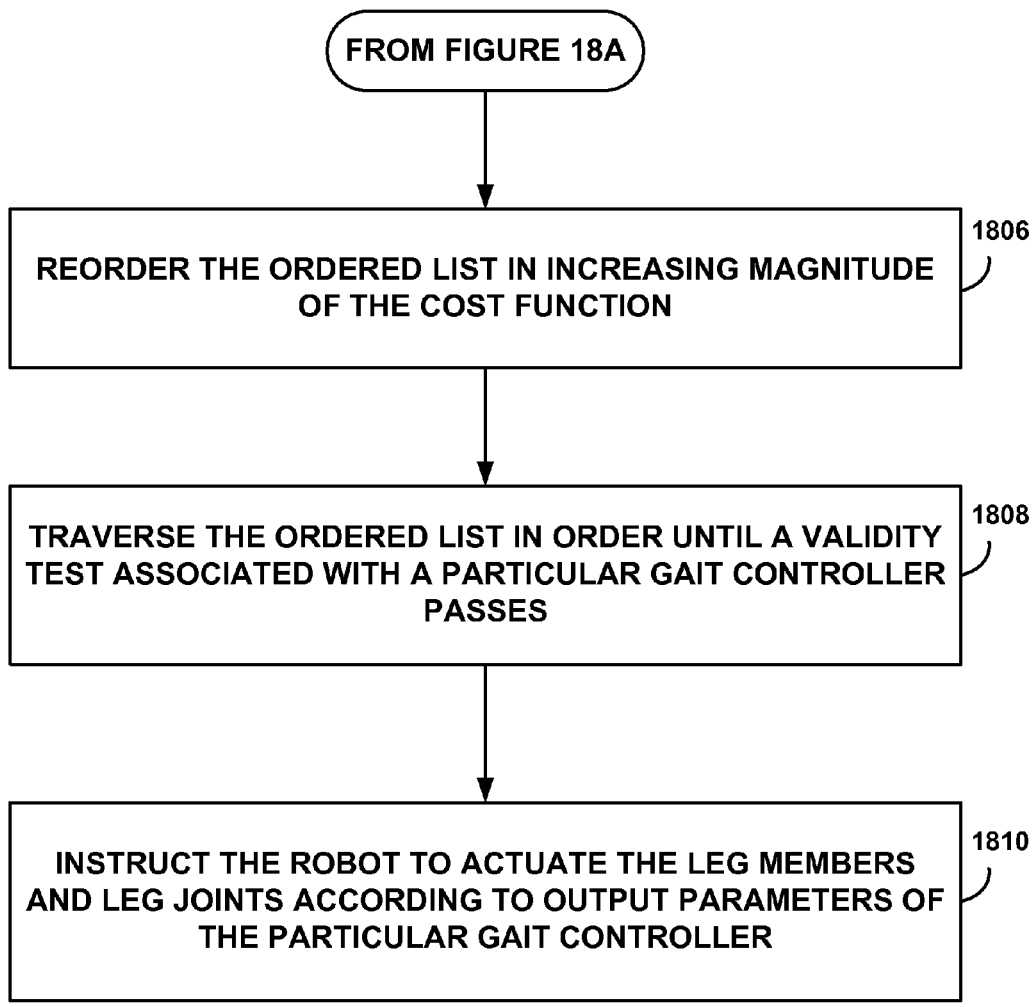

Turning to FIG. 18B, block 1806 may involve reordering the ordered list in increasing magnitude of the cost function. The target gait controller may be at the beginning of the ordered list before and after reordering. When the particular gait controller is not the target gait controller, the particular gait controller may be operable to change the state of the legged robot such that the changed state at least partially satisfies the validity checks of one or more gait controllers that appear in the ordered list (prior to or after reordering) before the particular gait controller.

Block 1808 may involve traversing the ordered list in order until a validity test associated with a particular gait controller passes. Block 1810 may involve instructing the robot to actuate the leg members and/or leg joints according to output parameters of the particular gait controller.

The input steering commands may include an input velocity and an input yaw rate. Likewise, the respective steering commands of the gait controllers may include respective velocities and yaw rates. The difference between the steering commands of the given gait controller and the input steering commands may be based on a difference between the respective velocity of the given gait controller and the input velocity, and a difference between the respective yaw rate of the given gait controller and the input yaw rate.

The cost may increase with the difference between the respective yaw rate of the given gait controller and the input yaw rate. The cost may also increase with the difference between the respective velocity of the given gait controller and the input velocity.

Applying the cost function may involve estimating a first location for the legged robot, should the legged robot operate according to the input velocity and input yaw rate for the pre-defined period of time, as well as estimating a second location for the legged robot, should the legged robot operate according to the given gait controller for the pre-defined period of time. The cost may be further based on a difference between the first location and the second location. Alternatively or additionally, applying the cost function may involve estimating a first yaw for the legged robot, should the legged robot operate according to the input yaw rate for the pre-defined period of time, and estimating a second yaw for the legged robot, should the legged robot operate according to the given gait controller for the pre-defined period of time. The cost may be further based on a difference between the first yaw and the second yaw.

In some cases, the cost increases in proportion to the proximity of the legged robot to the one or more obstacles should the robot operate according the given gait of the given gait controller for the pre-defined period of time. As a possible example, legged robot may include a proximity sensor that detects obstacles in multiple directions. The proximity of the legged robot to the one or more obstacles may be based on a signed-distance grid, points thereon representing respective distances from obstacles, and the signed-distance grid may be based on readings from the proximity sensor. The proximity-based cost may be derived, at least in part, from the signed-distance grid.

At least some of the gait controllers may be either cyclic gait controllers that define respective touchdown timings and positions for feet of the legged robot that cause the legged robot to operate according to the respective gaits, acyclic gait controllers that define touchdown timings and positions for the feet that cause the legged robot to transition from one gait to another, or recovery gait controllers that define touchdown timings and positions for the feet that cause the legged robot to recover from deviations from a cyclic or acyclic gait.

9. CONCLUSION

The present disclosure is not to be limited in terms of the particular implementations described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example implementations described herein and in the figures are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example implementations. Alternative implementations are included within the scope of these example implementations. In these alternative implementations, for example, operations described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A method comprising:
   obtaining, by a legged robot, input steering commands;
   in response to obtaining the input steering commands, selecting, by the legged robot, a target gait for the legged robot, wherein the legged robot includes leg members and leg joints;
   based on the target gait, obtaining, by the legged robot, an ordered list of gait controllers, wherein the gait controllers in the ordered list define respective gaits of the legged robot, and include respective validity tests and output parameters for the respective gaits, and wherein the output parameters include respective steering commands;
   applying, by the legged robot, a cost function to the gait controllers in the ordered list, wherein the cost function assigns respective costs to each gait controller, wherein a cost for a given gait controller is based on a difference between the steering commands of the given gait controller and the input steering commands, and a proximity of the legged robot to one or more obstacles should the legged robot operate according a given gait of the given gait controller for a pre-defined period of time;
   reordering, by the legged robot, the ordered list in increasing magnitude of the cost function;
   traversing, by the legged robot, the ordered list in order until a validity test associated with a particular gait controller passes; and
   actuating, by the legged robot, the leg members and leg joints according to output parameters of the particular gait controller.

2. The method of claim 1, wherein the input steering commands include an input velocity and an input yaw rate, wherein the respective steering commands of the gait controllers include respective velocities and yaw rates, and wherein the difference between the steering commands of the given gait controller and the input steering commands is based on a difference between the respective velocity of the given gait controller and the input velocity, and a difference between the respective yaw rate of the given gait controller and the input yaw rate.

3. The method of claim 2, where the cost increases with the difference between the respective yaw rate of the given gait controller and the input yaw rate.

4. The method of claim 2, wherein the cost increases with the difference between the respective velocity of the given gait controller and the input velocity.

5. The method of claim 2, wherein applying the cost function comprises:
estimating a first location for the legged robot, assuming that the legged robot operates according to the input velocity and input yaw rate for the pre-defined period of time;
estimating a second location for the legged robot, assuming that the legged robot operates according to the given gait controller for the pre-defined period of time, wherein the cost is also based on a difference between the first location and the second location.

6. The method of claim 2, wherein applying the cost function comprises:
estimating a first yaw for the legged robot, should the legged robot operate according to the input yaw rate for the pre-defined period of time;
estimating a second yaw for the legged robot, should the legged robot operate according to the given gait controller for the pre-defined period of time, wherein the cost is also based on a difference between the first yaw and the second yaw.

7. The method of claim 1, wherein the steering commands are received from a remote controller.

8. The method of claim 1, wherein the steering commands are based on a path that the legged robot has been instructed to follow.

9. The method of claim 1, wherein the target gait controller is at the beginning of the ordered list before and after reordering.

10. The method of claim 1, wherein the cost increases in proportion to the proximity of the legged robot to the one or more obstacles should the robot operate according the given gait of the given gait controller for the pre-defined period of time.

11. The method of claim 1, wherein the legged robot includes a proximity sensor that detects obstacles in multiple directions, and wherein the proximity of the legged robot to the one or more obstacles is based on a signed-distance grid, points thereon representing respective distances from obstacles, and wherein the signed-distance grid is based on readings from the proximity sensor.

12. The method of claim 1, wherein at least some of the gait controllers are either cyclic gait controllers that define respective touchdown timings and positions for feet of the legged robot that cause the legged robot to operate according to the respective gaits, acyclic gait controllers that define touchdown timings and positions for the feet that cause the legged robot to transition from one gait to another, or recovery gait controllers that define touchdown timings and positions for the feet that cause the legged robot to recover from deviations from a cyclic or acyclic gait.

13. The method of claim 1, wherein the pre-defined period of time is 2 seconds or less.

14. The method of claim 1, wherein the particular gait controller is not the target gait controller, and wherein the particular gait controller is operable to change the state of the legged robot such that the changed state at least partially satisfies the validity checks of one or more gait controllers that appear in the ordered list before the particular gait controller.

15. An article of manufacture including a non-transitory computer-readable medium, having stored thereon program instructions that, upon execution by a computing device, cause the computing device to perform operations comprising:
obtaining input steering commands for a legged robot;
in response to obtaining the input steering commands, selecting a target gait for the legged robot, wherein the legged robot includes leg members and leg joints;
based on the target gait, obtaining an ordered list of gait controllers, wherein the gait controllers in the ordered list define respective gaits of the legged robot, and include respective validity tests and output parameters for the respective gaits, and wherein the output parameters include respective steering commands;
applying a cost function to the gait controllers in the ordered list, wherein the cost function assigns respective costs to each gait controller, wherein a cost for a given gait controller is based on a difference between the steering commands of the given gait controller and the input steering commands, and a proximity of the legged robot to one or more obstacles should the legged robot operate according a given gait of the given gait controller for a pre-defined period of time;
reordering the ordered list in increasing magnitude of the cost function;
traversing the ordered list in order until a validity test associated with a particular gait controller passes; and
actuating the leg members and leg joints according to output parameters of the particular gait controller.

16. The article of manufacture of claim 15, wherein the input steering commands include an input velocity and an input yaw rate, wherein the respective steering commands of the gait controllers include respective velocities and yaw rates, and wherein the difference between the steering commands of the given gait controller and the input steering commands is based on a difference between the respective velocity of the given gait controller and the input velocity, and a difference between the respective yaw rate of the given gait controller and the input yaw rate.

17. The article of manufacture of claim 15, wherein applying the cost function comprises:
estimating a first location for the legged robot, assuming that the legged robot operate according to the input velocity and input yaw rate for the pre-defined period of time;
estimating a second location for the legged robot, assuming that the legged robot operate according to the given gait controller for the pre-defined period of time, wherein the cost is also based on a difference between the first location and the second location.

18. A legged robot comprising:
leg members connected by leg joints;
a processor; and
memory containing program instructions that, when executed by the processor, cause the legged robot to perform operations comprising:
obtaining input steering commands;
in response to obtaining the input steering commands, selecting a target gait for the legged robot;
based on the target gait, obtaining an ordered list of gait controllers, wherein the gait controllers in the ordered list define respective gaits of the legged robot, and include respective validity tests and output parameters for the respective gaits, and wherein the output parameters include respective steering commands;

applying a cost function to the gait controllers in the ordered list, wherein the cost function assigns respective costs to each gait controller, wherein a cost for a given gait controller is based on a difference between the steering commands of the given gait controller and the input steering commands, and a proximity of the legged robot to one or more obstacles should the legged robot operate according a given gait of the given gait controller for a pre-defined period of time;

reordering the ordered list in increasing magnitude of the cost function;

traversing the ordered list in order until a validity test associated with a particular gait controller passes; and actuating the leg members and leg joints according to output parameters of the particular gait controller.

19. The legged robot of claim 18, wherein the input steering commands include an input velocity and an input yaw rate, wherein the respective steering commands of the gait controllers include respective velocities and yaw rates, and wherein the difference between the steering commands of the given gait controller and the input steering commands is based on a difference between the respective velocity of the given gait controller and the input velocity, and a difference between the respective yaw rate of the given gait controller and the input yaw rate.

20. The legged robot of claim 18, wherein the cost increases in proportion to the proximity of the legged robot to the one or more obstacles when the robot operates according the given gait of the given gait controller for the pre-defined period of time.

* * * * *